(12) United States Patent
David et al.

(10) Patent No.: US 9,408,077 B1
(45) Date of Patent: Aug. 2, 2016

(54) COMMUNICATION ACTION BAR IN A MULTIMODAL COMMUNICATION DEVICE

(75) Inventors: Ram Adva Fish David, Menlo Park, CA (US); Dilip Raghu Kenchammana-Hosekote, Menlo Park, CA (US); Noam Rosenthal, Spring Hill (AU)

(73) Assignee: Nokia Corporation, Espoo (FI)

( * ) Notice: Subject to any disclaimer, the term of this patent is extended or adjusted under 35 U.S.C. 154(b) by 1456 days.

(21) Appl. No.: 11/820,453

(22) Filed: Jun. 18, 2007

Related U.S. Application Data

(60) Provisional application No. 60/814,172, filed on Jun. 16, 2006.

(51) Int. Cl.
| | | |
|---|---|---|
| *H04M 1/00* | (2006.01) | |
| *H04W 12/08* | (2009.01) | |
| *H04W 4/14* | (2009.01) | |
| *H04L 12/28* | (2006.01) | |
| *H04W 36/26* | (2009.01) | |

(52) U.S. Cl.
CPC ............... *H04W 12/08* (2013.01); *H04W 4/14* (2013.01); *H04L 2012/2841* (2013.01); *H04W 36/26* (2013.01)

(58) Field of Classification Search
CPC ............ H04L 63/0428; H04L 63/1441; H04L 2209/24; H04L 9/14; H04L 67/025; H04L 2012/2841; H04L 63/04; H04L 63/08; H04L 63/0861; H04L 63/105; H04L 12/58; H04L 63/0263; H04L 63/0823; H04L 63/0869

USPC .......... 455/456.1, 550.1; 726/2, 3, 4, 5, 6, 11, 726/27, 30; 713/168, 171, 176; 380/270

See application file for complete search history.

(56) References Cited

U.S. PATENT DOCUMENTS

| | | | |
|---|---|---|---|
| 5,199,069 | A | 3/1993 | Barrett et al. |
| 5,284,784 | A | 2/1994 | Manley |
| 5,721,780 | A | 2/1998 | Ensor et al. |
| 5,915,220 | A | 6/1999 | Chelliah |
| 6,097,964 | A | 8/2000 | Nuovo et al. |
| 6,981,223 | B2 | 12/2005 | Becker et al. |
| 7,007,239 | B1 | 2/2006 | Hawkins et al. |
| 7,117,445 | B2 | 10/2006 | Berger |

(Continued)

FOREIGN PATENT DOCUMENTS

WO   WO 2004/028078 A1   4/2004

OTHER PUBLICATIONS

"Instant Messaging and Presence on the Internet", ISOC Member Briefing #9, Internet Society, Nov. 11, 2002, Harald Alvestrand, 8pp., http://www.isoc.org/briefings/009/.

(Continued)

*Primary Examiner* — Nimesh Patel
(74) *Attorney, Agent, or Firm* — Ditthavong & Steiner, P.C.

(57) ABSTRACT

A method and apparatus for multimodal communication device capable of automatically determining an optimal communication mode. A user input selecting one of a contact and a stored communication is received, wherein each of the contact and the stored communication is associated with a destination. An optimal global communication mode to use for communicating with the destination is automatically determined from a plurality of communication modes. The destination is communicated with using the optimal global communication mode if a predefined condition is satisfied.

16 Claims, 20 Drawing Sheets

(56) References Cited

U.S. PATENT DOCUMENTS

| | | | |
|---|---|---|---|
| 7,187,935 B1 | 3/2007 | Day | |
| 7,224,973 B2 | 5/2007 | Tsutazawa et al. | |
| 7,421,270 B2 | 9/2008 | Serafat et al. | |
| 7,555,783 B2 | 6/2009 | Enright | |
| 2001/0023446 A1 | 9/2001 | Balogh | |
| 2002/0078150 A1 | 6/2002 | Thompson et al. | |
| 2002/0132610 A1 | 9/2002 | Chaplin et al. | |
| 2002/0152255 A1 | 10/2002 | Smith, Jr. et al. | |
| 2002/0176366 A1 | 11/2002 | Ayyagari et al. | |
| 2002/0178365 A1 | 11/2002 | Yamaguchi | |
| 2003/0054818 A1 | 3/2003 | Bahl et al. | |
| 2003/0087663 A1 | 5/2003 | Finke-Anlauff | |
| 2003/0099362 A1 | 5/2003 | Rollins | |
| 2003/0166405 A1 | 9/2003 | Jauk et al. | |
| 2003/0204748 A1 | 10/2003 | Chiu | |
| 2004/0003042 A1 | 1/2004 | Horvitz et al. | |
| 2004/0053601 A1 | 3/2004 | Frank et al. | |
| 2004/0071150 A1 | 4/2004 | Honkala et al. | |
| 2004/0078597 A1 | 4/2004 | Sun et al. | |
| 2004/0103156 A1 | 5/2004 | Quillen et al. | |
| 2004/0110543 A1 | 6/2004 | Mikan | |
| 2004/0203659 A1 | 10/2004 | Mikan | |
| 2004/0266489 A1 | 12/2004 | Chipchase et al. | |
| 2004/0268265 A1 | 12/2004 | Berger | |
| 2005/0125693 A1* | 6/2005 | Duplessis et al. | 713/201 |
| 2005/0147049 A1 | 7/2005 | Ganesan | |
| 2005/0163108 A1* | 7/2005 | Moore et al. | 370/352 |
| 2005/0265546 A1 | 12/2005 | Suzuki | |
| 2005/0268240 A1 | 12/2005 | Kankaanpaa | |
| 2005/0283729 A1 | 12/2005 | Morris et al. | |
| 2006/0031936 A1 | 2/2006 | Nelson et al. | |
| 2006/0051050 A1 | 3/2006 | Ning | |
| 2006/0056613 A1 | 3/2006 | Kim et al. | |
| 2006/0059253 A1 | 3/2006 | Goodman et al. | |
| 2006/0064719 A1 | 3/2006 | Youden | |
| 2006/0123347 A1 | 6/2006 | Hewitt et al. | |
| 2006/0135197 A1 | 6/2006 | Jin et al. | |
| 2006/0171537 A1 | 8/2006 | Enright | |
| 2006/0209773 A1 | 9/2006 | Hundal et al. | |
| 2006/0259474 A1 | 11/2006 | Granito | |
| 2006/0294465 A1 | 12/2006 | Ronen et al. | |
| 2007/0067738 A1 | 3/2007 | Flynt et al. | |
| 2007/0087775 A1 | 4/2007 | Richardson et al. | |
| 2007/0192410 A1 | 8/2007 | Liversidge et al. | |
| 2007/0211871 A1 | 9/2007 | Sjolander et al. | |
| 2007/0256025 A1 | 11/2007 | Yen et al. | |
| 2007/0266236 A1 | 11/2007 | Colditz | |
| 2008/0013751 A1 | 1/2008 | Hiselius | |
| 2008/0043958 A1 | 2/2008 | May et al. | |
| 2008/0119217 A1 | 5/2008 | Coxhill | |
| 2008/0301737 A1 | 12/2008 | Hjelmeland Almas et al. | |
| 2009/0170479 A1 | 7/2009 | Jarenskog | |
| 2010/0082980 A1 | 4/2010 | Shiraki | |

OTHER PUBLICATIONS

"Messaging & Collaboration", "Microsoft Extending IM Presence, Interoperability", eWeek.com, 4pp., http://www.eweek.com/article2/0,1895,1493184,00.asp.

http://www.microsoft.com/technet/prodtechnol/ofifce/livecomm/library/como/gettingstartecl/ComoGS_4.mspx, "Microsoft Office Communicator Mobile Getting Started Guide", Viewing and Changing Presence Information, Microsoft TechNet, Apr. 1, 2006.

http://www.xmpp.org/rfcs/rfc3921.html, "Extensible Messaging and Presence Protocol (XMPP): Instant Messaging and Presence", Network Working Group, Request for Comments: 3921, Category: Standards Track, P. Saint-Andre, Ed., Jabber Software Foundation, Oct. 2004, RFC 3921, TOC, 84pp.

Nokia 6682 User Guide (May 4, 2005).

Office action for related U.S. Appl. No. 11/820,456 dated Jun. 18, 2010, pp. 1-27.

Office action for related U.S. Appl. No. 11/820,456 dated Dec. 17, 2010, pp. 1-21.

Office Action for related U.S. Appl. No. 11/820,783 dated Mar. 28, 2011, pp. 1-30.

Office Action for related U.S. Appl. No. 11/820,456 dated Apr. 29, 2011, pp. 1-102.

Office Action for related U.S. Appl. No. 11/820,456 dated Oct. 18, 2011, pp. 1-18.

Office Action for related U.S. Appl. No. 11/820,783 dated Dec. 23, 2011, pp. 1-33.

Final Rejection for related U.S. Appl. No. 11/820,783 dated Oct. 18, 2012, pp. 1-33.

* cited by examiner

COMMUNICATION ACTION BAR IN A MULTIMODAL COMMUNICATION DEVICE

PRIORITY

This application claims the benefit of U.S. Provisional Application No. 60/814,172, which was filed on Jun. 16, 2006.

TECHNICAL FIELD

Embodiments of the present invention relate to communication devices, and more specifically to communication devices that are capable of communicating using multiple communication modes.

BACKGROUND

A multimodal communication device is a communication device that is capable of communicating using multiple different communication modes. Many of the communication modes found on a modern multimodal communication device were originally developed for desktop computers. Examples of such communication modes include instant messaging (IM), email, and peer-to-peer (P2P) voice. The user interface environment for which these communication modes were developed includes a large screen (e.g., 15 inch monitor), a full keyboard, and a pointing device (e.g., a mouse).

Communication modes that were originally developed for desktop computers have been added to mobile devices such as cellular phones. However, mobile devices are generally designed to be small, lightweight and easily portable. Accordingly, mobile devices typically have displays of limited size and have limited input devices.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
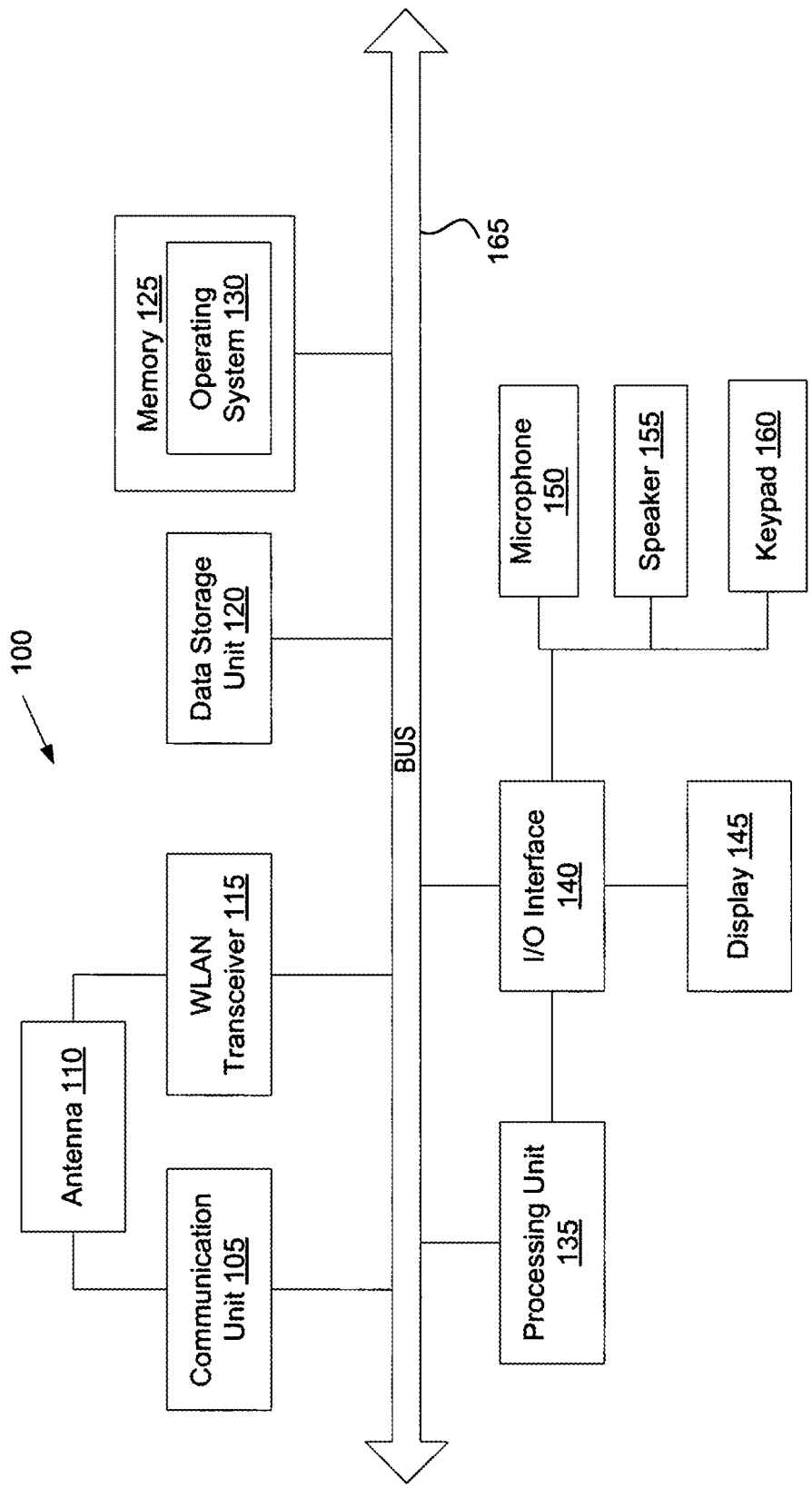
FIG. 1A illustrates a high level block diagram of a multimodal communication device, in accordance with one embodiment of the present invention.

Described herein is a method and apparatus for a multimodal communication device capable of automatically determining an optimal communication mode. In one embodiment, a multimodal communication device, receives a user input selecting one of a contact and a stored communication. Each of the contact and the stored communication may be associated with a destination. An optimal global communication mode may automatically be determined to use for communicating with the destination. The optimal global communication mode may be determined from multiple available communication modes. Communication may be initiated with the destination using the optimal global communication mode if a predefined condition is satisfied (e.g., user input is received via a key such as a send key, or when a time interval passes).

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "determining", "calculating", "filtering", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1A illustrates a high level block diagram of a multimodal communication device 100, in accordance with one embodiment of the present invention. As shown, the multimodal communication device 100 may be any device capable of receiving and transmitting data. In one embodiment, the multimodal communication device 100 is a mobile device such as a mobile phone, a personal digital assistant (PDA), a notebook computer, etc. Alternatively, the multimodal communication device 100 may be a wired phone device such as a voice over internet protocol (VOIP) phone.

The multimodal communication device 100 contains a processing unit 135 that is communicatively coupled to other components of the multimodal communication device 100 via a bus 165. The multimodal communication device 100 also includes memory 125 coupled to the bus 165. The memory 125 represents any form of random access memory (RAM), read-only memory (ROM), flash memory, or a combination thereof. Memory 125 stores, among other things, the operating system 130 of the multimodal communication device 100.

The multimodal communication device 100 contains a data storage unit 120. The data storage unit 120 may be or include any conventional medium for storing data in a non-volatile manner. The processing unit 135 and the data storage unit 120 may communicate via the bus 165. Memory 125 and data storage unit 120 store software instructions and/or data, which may include instructions and/or data used to implement the techniques introduced herein.

The multimodal communication device 100 also includes an I/O interface 170, which may reside on the same microprocessing chip as the processing unit 135. However, I/O interface 140 may also reside on an external unit. I/O interface 140 connects the processing unit 135 to one or more components for receiving user input or presenting information to a user. The I/O interface 140 may be connected with a keypad input 160. In one embodiment, the keypad input 160 includes an alphanumeric phone keypad, a joystick, an accept key, programmable softkeys, and SEND/END keys. Alternatively, the keypad may include one or more additional keys instead of or in addition to those keys mentioned. For example, the keypad may include a QWERTY keypad instead of an alphanumeric phone keypad, or a scroll wheel or rollerball instead of the joystick. Other additional keys may include, for example, volume keys, a home key, a back key, etc. The I/O interface 140 may also be connected with a microphone input 150, a speaker output 155 and a display 145. The I/O interface 140 may include an analog-to-digital converter for converting an analog microphone signal to a digital signal for use by the processing unit 135. The I/O interface 140 may also include a digital-to-analog converter to convert digital information from the processing unit 135 to the speaker 155, such as voice data.

The processing unit 135 transmits and receives digital signals which are to be communicated outside the multimodal communication device 100 via the communication unit 105. In one embodiment, the communication unit 105 is connected to an antenna 110, which communicates signals through airwaves to a GSM network. In a further embodiment, the multimodal communication device 100 also includes a wireless local area network (WLAN) transceiver 115 to communicate wirelessly with a WLAN (such as a Wi-Fi network) via the antenna 110. The WLAN transceiver 115 may be coupled with the processing unit 135 via the system bus 165. In another embodiment, the communication unit 105 is connected with a public network (e.g., Internet) or private network (e.g., Ethernet or a local area Network (LAN)) via a wired connection (e.g., Ethernet cable, coaxial cable, fiber optic, phone cable, etc.).

Figure 1B:
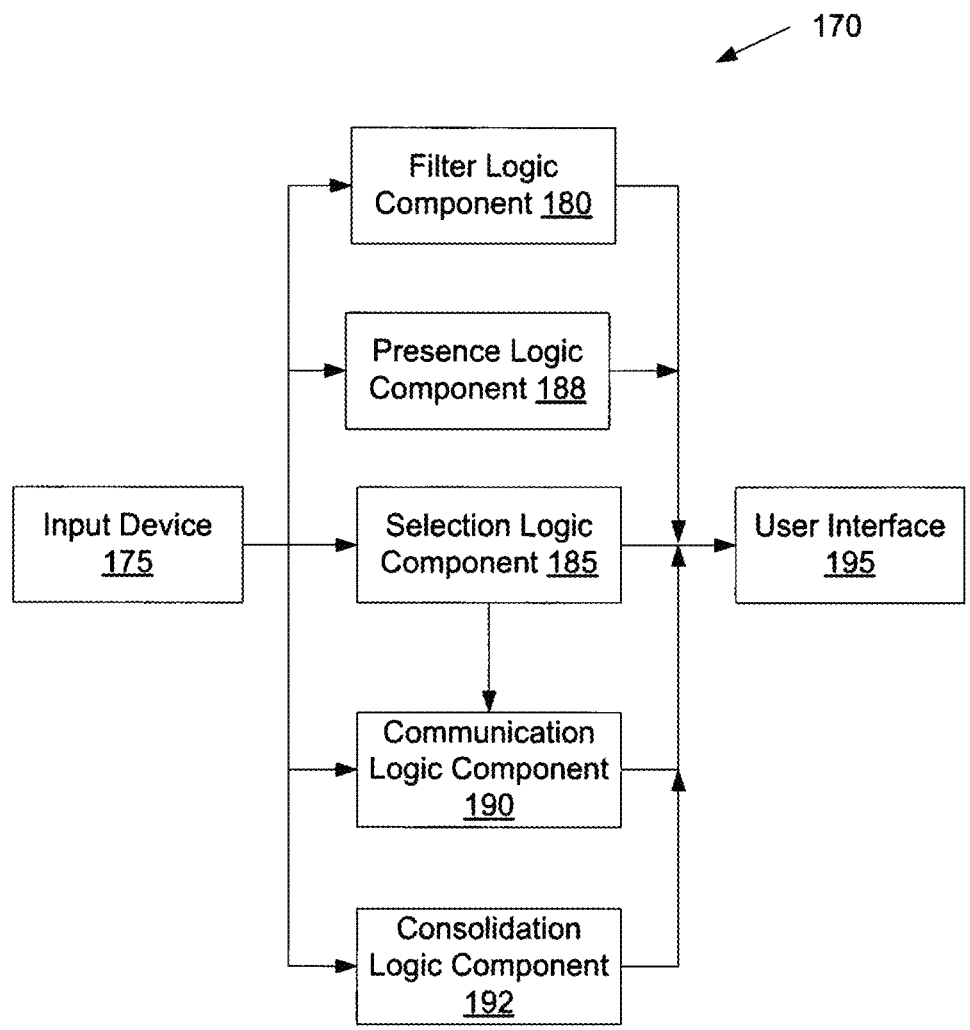
FIG. 1B illustrates a multimodal communication device, in accordance with one embodiment of the present invention.

FIG. 1B illustrates a multimodal communication device 170, in accordance with one embodiment of the present invention. In one embodiment, the multimodal communication device 170 corresponds to the multimodal communication device 100 of FIG. 1A. In one embodiment, the multimodal communication device 170 includes an input device 175, a filter logic component 180, a selection logic component 185, a communication logic component 190, a consolidation logic component 192 and a user interface 195. Alternatively, the multimodal communication device may include more or fewer logic components.

Input device 175 is configured to receive user input. In one embodiment, the input device 175 includes a keypad, such as keypad 160 of FIG. 1A. Alternatively, the input device 175 may include a touch-sensor pad and/or touch-sensor buttons, a microphone, etc.

User interface 195 is configured to present information to a user of the multimodal communication device 170. The user interface 195 in one embodiment is a graphical user interface, and includes a display such as display 145 of FIG. 1A. In other embodiments, the user interface 195 may also present audio information and tactile feedback (e.g., vibration) to the user.

Filter logic component 180 filters data (e.g., contacts, messages, calls, etc.) to control what data is presented via the user interface 195. In one embodiment, the filter logic component 180 filters data according to predefined subsets of the data being filtered. Such predefined subsets may be scrolled through (toggled between) upon receiving user input via the input device 175. For example, a unified inbox may present all incoming and outgoing calls and messages when the filter logic component 180 is not applying a filter. Application of a first predefined subset of the unified inbox by the filter logic component 180 may filter out all calls and messages except for email messages, application of a second predefined subset of the unified inbox may filter out all but incoming phone calls, and so on.

In another embodiment, the filter logic component 180 filters data according to keyword searches. Filter logic component 180 may apply keyword search filters to data already filtered by a predefined subset, or to previously unfiltered data. In one embodiment, if a keyword filter is applied to filtered data, the keyword filter further filters the filtered data. In another embodiment, when a keyword filter is applied to filtered data, the previous filter is removed before applying the keyword filter. Keyword filters are applied upon receipt of a keyword via the input device 175. Keywords may include any combination of alphanumeric symbols and/or other symbols that may be entered via the input device 175.

Selection logic component 185 automatically determines optimal communication modes for communicating with destinations (e.g., a contact, remote sender of a message, remote recipient of a message, etc.). Examples of communication modes include cellular phone call, VOIP, PTT, voice mail, voice email, voice note (Vnote), email, SMS, instant messaging, video call, video email, multimedia messaging service (MMS), etc. Selection logic component 185 may automatically determine an optimal global communication mode (an optimal communication mode chosen from all available communication modes) when a destination is selected and/or when an incoming communication is received. Selection logic component 185 may also automatically determine one or more optimal local communication modes (an optimal communication mode chosen from a subset of all available communication modes) when the destination is selected or the incoming communication is received.

Selection logic component 185 may divide the communication modes into distinct communication mode categories, and determine an optimal local communication mode for each communication mode category. In one embodiment, selection logic component 185 divides the communication modes into a synchronous voice communication mode category (including cellular calls, VOIP, PTT, video call, etc.), an asynchronous voice communication mode category (including voice email, voicemail, V-note, video email, etc.), a synchronous text communication mode category (e.g., instant message), and an asynchronous text communication mode category (e.g., email, SMS, etc.). In other embodiments, the communication modes may be divided into other communication mode categories.

Selection logic component 185 may also determine an optimal communication mode category with which to initiate or respond to a communication. In one embodiment, selection logic component 185 ranks the communication mode categories from a most optimal communication mode category to a least optimal communication mode category, and causes the communication mode categories to be presented to the user via user interface 195 in ranked order. Alternatively, the communication mode categories may be displayed in a predetermined order regardless of which communication mode category is optimal.

Selection logic component 185 may automatically determine an optimal global communication mode and optimal local communication modes based on multiple parameters. Examples of such parameters include user preferences, cellular calling rates, service availability, contact type of the destination, etc. Selection logic component 185 may apply different weights to each parameter that is considered. For example, if a user preference indicates that a particular communication mode should be used for communicating with a destination, then the user preference may take precedence over other parameters. The parameters to use in determining an optimal communication mode or modes and the weights of the parameters may vary depending on user preferences and/or user profile. User profiles may include, for example, a busy profile, an in meeting profile, a sleeping profile, an available profile, etc. For each profile, different rules may be used to determine optimal global and/or local communication modes. Such rules may be specific to distinct contacts, to specified text included in messages, etc. For example, a "work" profile can be programmed to show presence status as as online to a co-worker, as "busy" to family and as "offline" to friends.

In one embodiment, selection logic component 185 determines optimal communication modes based on one or more of attributes related to the multimodal communication device (e.g., local time, battery life, etc.), attributes related to services provided to the multimodal communication device (e.g., cellular calling rates and VOIP calling rates such as roaming fees, nighttime rates, weekend rates, daytime rates, international rates, domestic rates, local rates, etc.), a communication mode previously used to contact the destination, user preferences, contact type (e.g., business or personal), attributes related to the destination (e.g., instant message presence, destination local time, destination business hours, destination sleep hours, destination location, etc.), and availability of service (VOIP, cellular, instant messaging, PTT, V-note, voicemail, email, SMS, etc.). Alternatively, other parameters may be considered in addition to or instead of the parameters listed.

A first exemplary algorithm for automatically determining an optimal communication mode is shown below, in accordance with one embodiment of the present invention. In the first exemplary algorithm, if a user preference indicates a communication mode to use, that communication mode is displayed and the algorithm ends. If there is no user preference, then the algorithm determines an order in which to present multiple communication mode categories (e.g., synchronous text, etc.) based on different parameters.

Exemplary pseudo-code for the above algorithm is as follows:

```
START
   IF user has set an overriding preference for communication mode
      for specific contact
      THEN present the specific mode of communication
   ENDIF
   IF presence status of destination contact is online AND NOT in a busy
      state
      OR contact is a business contact and destination time is during business
         hours
      OR contact is a personal contact and destination time is not during
         business hours
      OR last call to contact was a synchronous call
         THEN present communication mode categories in the order of
         Synchronous
   Voice, Synchronous Text, Asynchronous Voice, Asynchronous Text
      ELSE present communication mode categories in the order of
         Asynchronous
   Voice, Asynchronous Text, Synchronous Text, Synchronous Voice
   ENDIF
STOP
```

A second exemplary algorithm for automatically determining an optimal communication mode is shown below, in accordance with another embodiment of the present invention. The second exemplary algorithm determines an optimal local communication mode for the synchronous voice communication mode category. For the second exemplary algorithm, it is assumed for illustration only that a user preference indicates instant messaging (IM) voice is the preferred synchronous voice communication mode, followed by PTT, SIP (a VOIP service), and finally cellular service, in descending order of preference. It is also assumed that the destination is an IM buddy, has a phone number, and can use PTT.

Exemplary pseudo-code for the above algorithm is as follows:

```
START
   IF presence status of destination is online AND NOT in a busy state
      THEN call using IM voice
      ELSE
         IF PTT service is available and destination is reachable via PTT
            THEN use PTT
            ELSE
               IF cellular service is available and cellular service is cheaper
                  than SIP service at present time
                  THEN use cellular service
                  ELSE
                     IF SIP service is available
                        THEN use SIP service
                        ELSE
                           IF cellular service is available
                              THEN use cellular service
                              ELSE inform user that no synchronous method
                              is available
```

```
            ENDIF
         ENDIF
      ENDIF
   ENDIF
STOP
```

A third exemplary algorithm for automatically determining an optimal communication mode is shown below, in accordance with yet another embodiment of the present invention. The third exemplary algorithm determines an optimal local communication mode for the asynchronous voice communication mode category.

Exemplary pseudo-code for the above algorithm is as follows:

```
START
   IF V-note service available
      THEN send V-note
      ELSE
         IF mail service available
            THEN send voice message as email attachment
            ELSE
               IF IM voicemail service is available
                  THEN use send IM voicemail
               ENDIF
         ENDIF
   ENDIF
STOP
```

A fourth exemplary algorithm for automatically determining an optimal communication mode is shown below, in accordance with still another embodiment of the present invention. The fourth exemplary algorithm determines an optimal local communication mode for the asynchronous text communication mode category.

Exemplary pseudo-code for the above algorithm is as follows:

```
START
   IF attachments are to be sent
      THEN use email
      ELSE
         IF SMS is cheaper than email
            THEN use SMS
            ELSE use email
         ENDIF
   ENDIF
STOP
```

Returning to FIG. 1B, presence logic component 188 determines presence status of destination users. Presence status indicates online status (e.g., offline, online and busy, online and available, etc.) for the destination user. In one embodiment, presence status of the destination user is determined using one or more instant messaging service (e.g., America Online® instant messenger (AIM), ICQ®, Yahoo® instant messenger, Microsoft® instant messenger, etc.). Therefore, if the destination user is logged into any one of the multiple instant messaging services, for example, presence logic component 188 may determine that the destination user is online. In another embodiment, presence status of the destination user is determined by querying a presence server provided by a cellular phone service. In yet another embodiment, in a peer-to-peer (P2P) IM network, presence status may be provided by one or more peers. Alternatively, presence status may be determined using a combination of instant messaging services, P2P IM networks and a presence server of a cellular phone service.

In one embodiment, presence logic component 188 determines presence status of contacts (e.g., contacts of a unified contacts list) irrespective of communications (incoming and outgoing messages and calls) in which these contacts participate. In another embodiment, presence logic component 188 determines presence status of remote senders and recipients of specific incoming and outgoing messages and calls. Once presence status is determined, the presence status may be presented to a user via user interface 195.

Communication logic component 190 initiates communication with the destination user. In one embodiment, communication logic component 190 communicates using one of the optimal communication modes (e.g., the optimal global communication mode or an optimal local communication mode) as determined by the selection logic component 190. In another embodiment, communication logic component 190 communicates using a communication mode that has been user selected via input device 175. Data presented via the user interface 195 may change based on the communication mode that communication logic component 190 uses to initiate communication.

Consolidation logic component 192 consolidates contact entries entered into multimodal communication device 170. Consolidation logic component 192 may consolidate contact entries upon a user request, or automatically when a new contact entry is received. If a new contact entry has been added, consolidation logic component 192 may compare the new contact entry to preexisting contact entries. If a user command is received to perform consolidation, then each contact entry may be compared to each other contact entry. If a match is found, then the new/matching contact entry may be combined into the preexisting contact entry. A match may occur, for example, when two contact entries share the same name, phone number, email address, IM buddy alias, etc.

In one embodiment, each of the logic components (e.g., filter logic component 180, presence logic component 188, etc.) includes a state machine (e.g., an internal logic that knows how to perform a sequence of operations). In another embodiment, some or all of the logic components may include a logic circuit (e.g., a logic that goes through a sequence of events in time, or a logic whose output changes immediately upon a changed input), or a combination of a state machine and a logic circuit. In yet another embodiment, some or all of the logic components may be implemented as software executed by a processor, or as a combination of hardware (e.g., state machine or logic circuit) and software.

Figure 2:
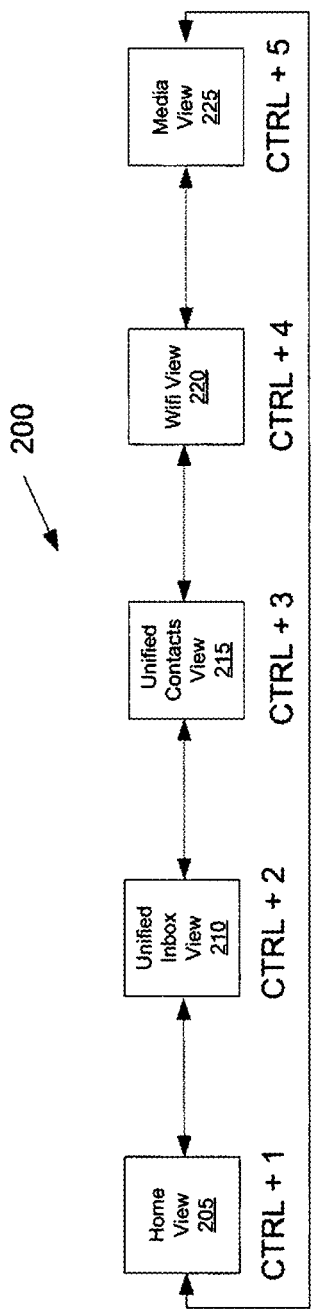
FIG. 2 illustrates a list of views that may be presented via a user interface of a multimodal communication device, in accordance with one embodiment of the present invention.

FIG. 2 illustrates a list of views 200 that may be presented via a user interface (e.g., user interface 195 of FIG. 1B) of a multimodal communication device, in accordance with one embodiment of the present invention. The list of views 200 may be presented as a navigation bar in the user interface. In one embodiment, the list of views 200 includes a home view 205, a unified inbox view 210, a unified contacts view 215, a settings view 215 and a media view 225. Alternatively, the list of views 200 may include more, fewer, and/or different views.

In one embodiment, the list of views 200 is presented as a tabbed list such that each view is represented by a separate tab. Each tab may include text and/or graphics to identify the view it represents. When a tab is selected, the view associated with the tab may be presented. In another embodiment, the list of views 200 may be presented in other formats, such as a carousel type display bar. Such a list of views 200 provides an intuitive user interface that can be navigated using fewer clicks/commands than a traditional hierarchical based system where a user navigates a sequence of hierarchical menu screens before viewing available commands and/or initiating appropriate actions.

In one embodiment, the list of views 200 represents a primary arrangement and presentation of information in a multimodal communication device. In another embodiment, the list of views 200 can be used as a home screen, idle-screen, or phone top plugin or application of a traditionally organized mobile phone. In such an embodiment, the list of views 200 and each view presented in the list (e.g., unified inbox view, unified contacts view, etc.) may provide an alternate shortcut method to access communication features of the mobile phone without navigating hierarchical menus.

In one embodiment, each view is linked to a specific key of a keypad, such that when the key is pressed, that view is displayed. For example, if CTRL and 1 are pressed, the home view 205 may be presented. In another embodiment, views may be cycled between using, for example, left and right directional keys. Therefore, for example, if the unified contacts view 215 is being presented, the settings view 220 may be presented if the right directional key is pressed, and the unified inbox view 210 may be presented if the left directional key is pressed. In other embodiments, views may be selected using additional means. For example, if a stylus is provided, the home view 205 may be presented if the stylus taps on the tab representing the home view 205. Each of the home view 205, unified inbox view 210, unified contacts view 215, settings view 220 and media view 225 are described in more detail below with reference to FIGS. 3-7C.

Figure 3:
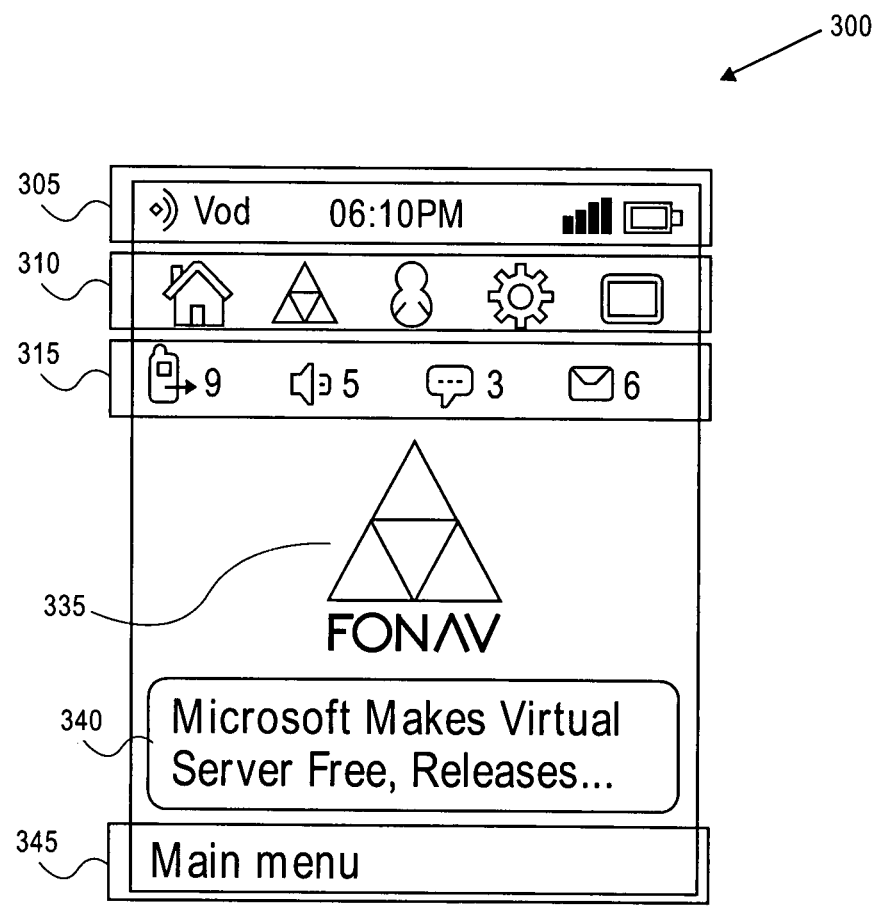
FIG. 3 illustrates a home view, in accordance with one embodiment of the present invention.

FIG. 3 illustrates a home view 300, in accordance with one embodiment of the present invention. The home view 300 may be a part of a graphical user interface presented on a multimodal communication device, such as multimodal communication device 170 of FIG. 1B.

Home view 300 may include a title bar 305 that can contain icons, images and/or text indicating the current time, battery power, volume level, connectivity, etc. for the multimodal communication device. Home view 300 can also include a navigation bar 310 that may present an icon, image and/or text for each view in the list of views 200 shown in FIG. 2. A visual indication that the home view is currently being presented may be provided by the navigation bar 310. For example, in the illustrated embodiment, an icon of a house representing the home view 300 is highlighted to indicate that the home view 300 is being presented.

Home view 300 may include a messages and calls bar 315 that indicates, for example, a number of missed calls, a number of unheard voice messages, a number of unread instant messages, a number of unread email and/or SMS messages, etc. Home view 300 may also include a background image 335. Home view 300 may also include a recent message window 340 that contains a summary of the most recent missed call, voice message, unread received text message, etc.

In addition, the home view 300 can include a softkey bar 345 including one or more softkey function labels (e.g. main menu, new, more, etc.). A softkey is typically a button located proximate to the display space. Generally, the function of the button is defined by the softkey function label shown near the button on the display space. In the illustrated embodiment, the softkey bar 345 includes the softkey function label of "main menu" for a left softkey. If a user presses the left softkey from the home view 300, a view of the main menu is presented. In one embodiment, a summary of available services, current presence status, current profile, and additional information can be displayed from the home view 300 by the press of a single key (e.g., a joystick up or down key).

Figure 4A:
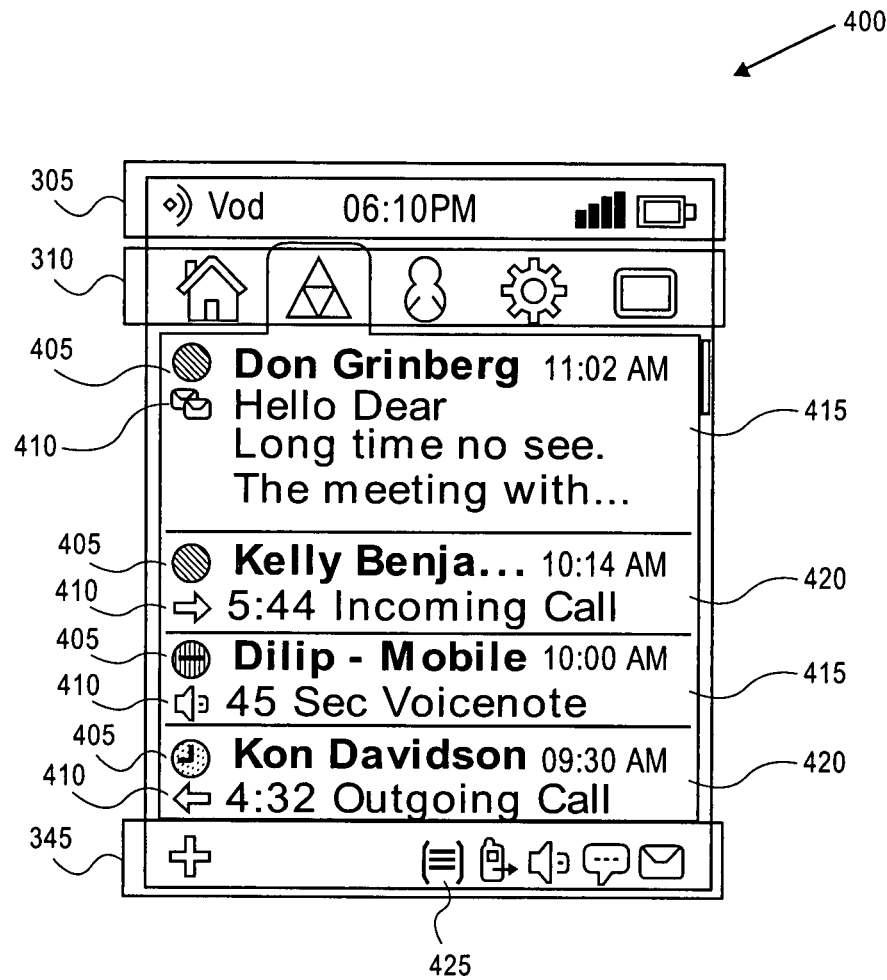
FIG. 4A illustrates a unified inbox view of a graphical user interface presented by a multimodal communication device, in accordance with one embodiment of the present invention.

FIG. 4A illustrates a unified inbox view 400 of a graphical user interface presented by a multimodal communication device, in accordance with one embodiment of the present invention. In one embodiment, the multimodal communication device corresponds to multimodal communication device 170 of FIG. 1B.

Referring to FIG. 4A, unified inbox view 400 can include title bar 305, navigation bar 310, and softkey bar 345. An icon of a triangle in the navigation bar 310 representing the unified inbox view 400 is highlighted to indicate that the unified inbox view 400 is being presented.

Unified inbox view 400 includes multiple incoming and outgoing messages 415 and calls 420. Incoming and outgoing calls 420 may include cellular phone calls, VOIP phone calls, instant message voice calls, etc. The incoming and outgoing messages 415 may include SMS messages, email messages, voicemail messages, V-note messages, instant messages, etc. In one embodiment, all incoming and outgoing messages 415 and calls 420 are included in the unified inbox.

Incoming and outgoing messages 145 and calls 420 include a name of a remote sender or recipient, if the name is available. Where no name is available, an email address, phone number, buddy alias, etc., may be displayed.

Each incoming and outgoing message 415 and call 420 may include current presence status 405 of a remote sender or recipient of the message 415 or call 420. The presence status 405 presented in the unified inbox view 400 may be updated continuously, periodically, or upon user input. In one embodiment, a green icon indicates an online/available presence, a red icon indicates an offline presence, and an orange icon indicates an online/busy presence. Alternatively, presence status 405 may be indicated in other ways (e.g., by color coding a name of the sender or recipient). Presence status 405 may also indicate additional presence information such as with customized messages and/or icons/images (e.g., away from keyboard, be right back, in meeting, etc.).

Incoming and outgoing messages 415 and calls 420 may include one or more icons and/or text indicating a communication type. For example, text may indicate that a stored communication is an incoming call, an outgoing call, a voice note (V-note), a missed call, an unanswered call, etc. In the illustrated embodiment, each communication (e.g., message or call) includes a communication type icon 410. Examples of communication type icons 410 include a left facing arrow to represent outgoing calls, a right facing arrow to represent incoming calls, a speaker to represent an asynchronous voice communication (e.g., voicemail), an envelope to represent an asynchronous text communication (e.g., email), and so on. Communications presented in the unified inbox view 400 may also include a time that the communication was sent or received, and a length of the communication (e.g., how long a call lasted, how many lines of text in a message, etc.). In one embodiment, displayed messages 415 include part of a message body. A message's presented size in the unified inbox view 400 may be at least partially dependent on the contents of the message (e.g., increased height for longer messages).

The softkey bar 345 presented in the unified inbox view 400 includes icons and/or text representing multiple predefined filtered views. Each predefined filtered view may present a predefined subset of the incoming and outgoing messages and calls included in the unified inbox. In one embodiment, a first icon 425 (e.g., three bracketed horizontal lines) represents an unfiltrered view, a second icon (e.g., a cellular phone with an arrow) represents calls, a third icon (e.g., a speaker) represents voice messages, a fourth icon (e.g., a speech balloon) represents instant messages, and a fifth icon (e.g., an envelope) represents email messages. Alternatively more or fewer icons and/or text may be used to represent the same or different filtered views.

A predefined subset of the incoming and outgoing communications currently presented in the unified inbox view 400 may be indicated by highlighting text and/or icons within the softkey bar 345. In the illustrated embodiment, the first icon 425 representing an unfiltered view is highlighted. Different filtered views may be presented if a filter command is received (e.g., when a user pushes a filter key). In one embodiment, a filter function is assigned to a softkey, such that when the appropriate softkey is pressed, a next predefined subset of the incoming and outgoing messages and calls is shown in the unified inbox view 400. In this manner, the different predefined filtered views may be scrolled between by repetitively toggling the filter key.

Figure 4B:
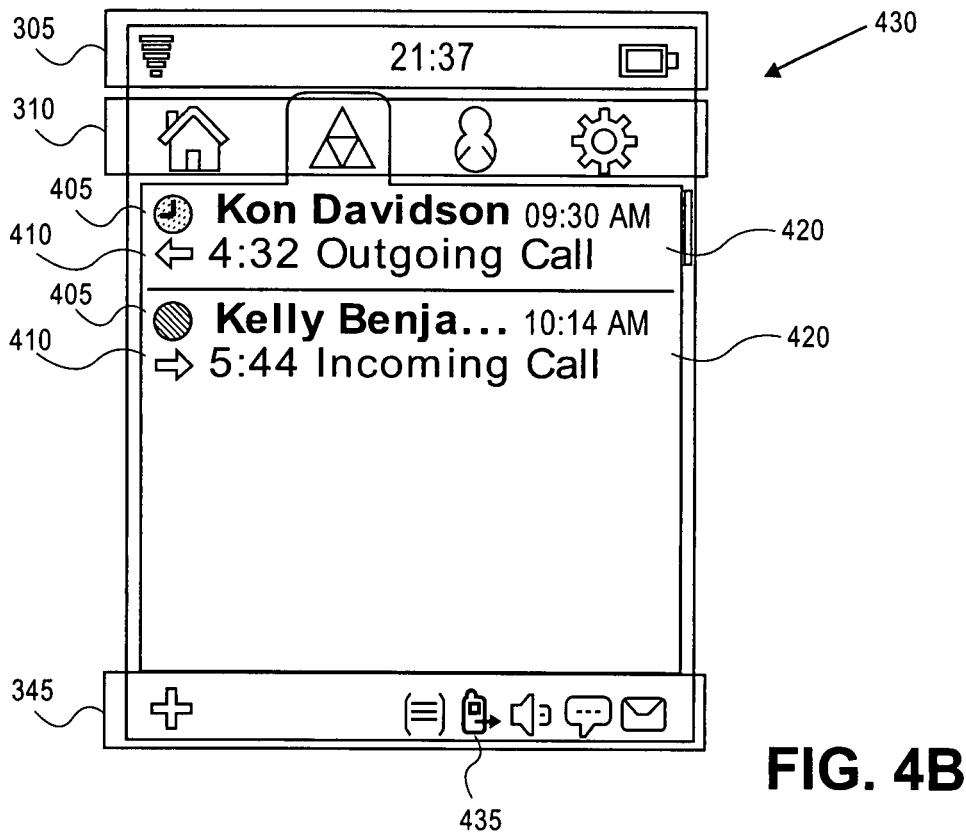
FIG. 4B illustrates a unified inbox view of a graphical user interface presented by a multimodal communication device, in accordance with another embodiment of the present invention.

FIG. 4B illustrates a unified inbox view 430 of a graphical user interface presented by a multimodal communication device, in accordance with another embodiment of the present invention. In one embodiment, unified inbox view 430 displays a first predefined subset of the incoming and outgoing messages and calls included in the unified inbox. The predefined subset currently presented in the unified inbox view 430 is indicated by highlighting an icon (e.g., the second icon 435) within the softkey bar 345. In the illustrated embodiment, the second icon 435 represents a filtered view that displays only incoming and outgoing calls 420.

Figure 4C:
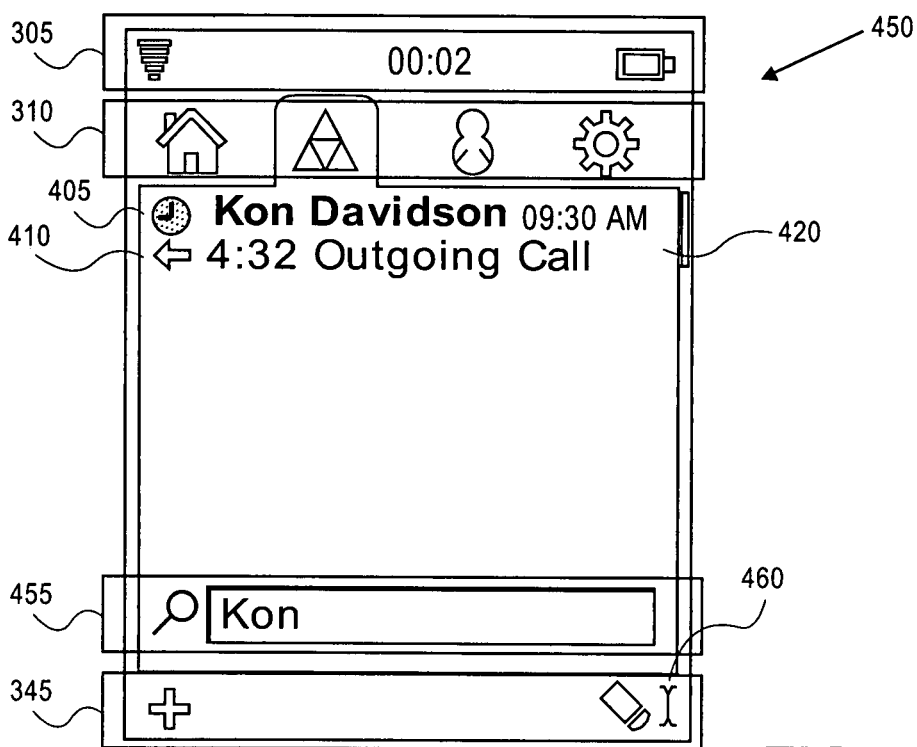
FIG. 4C illustrates a unified inbox view of a graphical user interface presented by a multimodal communication device, in accordance with yet another embodiment of the present invention.

FIG. 4C illustrates a unified inbox view 450 of a graphical user interface presented by a multimodal communication device, in accordance with yet another embodiment of the present invention. In one embodiment, unified inbox view 450 displays a subset of the incoming and outgoing messages and calls included in unified inbox view 430 of FIG. 4B after a keyword filter has been applied. Alternatively, unified inbox view 450 displays a subset of the incoming and outgoing messages and calls included in unified inbox view 400 of FIG. 4A after the keyword filter has been applied. The keyword filter may be applied upon receiving a user command to execute a keyword filter. The keyword filter command may be received when the user enters a keyword using an alphanumeric keypad (e.g., when the user presses a number or letter key). If the keyword filter command is received while unified inbox view 430 of FIG. 4B is presented, the predefined filter may be removed before applying the keyword filter. Alternatively, the keyword filter may be applied in addition to the predefined filter.

Referring to FIG. 4C, a search bar 455 may be presented in the unified inbox view 450 when the keyword filter is initiated. In one embodiment, the search bar 455 is presented upon a user pressing a key in an alphanumeric keypad. In the illustrated example, a keyword "kon" has been entered. Therefore, a single communication is presented for a call made to Kon Davidson.

The softkey bar 345 presented in unified inbox view 450 may include icons 460 indicating one or more actions (e.g., editing actions such as erase, copy, etc.) when the keyword filter is applied.

Figure 5A:
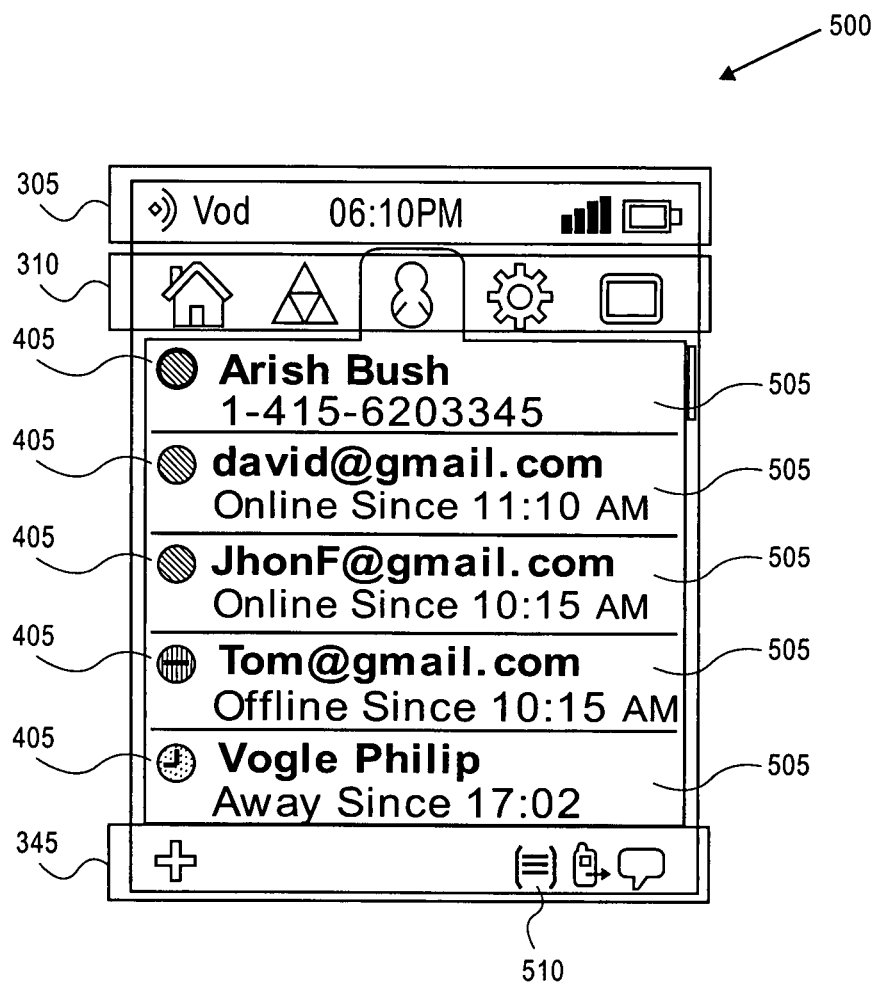
FIG. 5A illustrates a unified contacts view of a graphical user interface presented by a multimodal communication device, in accordance with one embodiment of the present invention.

FIG. 5A illustrates a unified contacts view 500 of a graphical user interface presented by a multimodal communication device, in accordance with one embodiment of the present invention. In one embodiment, the multimodal communication device corresponds to multimodal communication device 170 of FIG. 1B.

Referring to FIG. 5A, unified contacts view 500 can include title bar 305, navigation bar 310, and softkey bar 345. An icon of a person in the navigation bar 310 representing the unified contacts view 500 is highlighted to indicate that the unified contacts view 500 is being presented.

Unified contacts view 500 includes multiple contacts 505. Contacts 505 may be email contacts, cellular phone contacts, VOIP phone contacts, IM contacts, etc. A single contact entry may include contact information for multiple contact information types. For example, a contact entry may include a cellular phone number, a plain old telephone service (POTS) home phone number, a work phone number, a VOIP phone number, an IM buddy alias, an email address, etc.

In one embodiment, each contact 505 presented in the unified contacts view 500 includes an optimal global communication mode (e.g., cellular service, email, IM, etc.). The optimal global communication mode may be determined as discussed with reference to FIG. 1B. Alternatively, each contact may be presented with a default communication mode (e.g., a phone number if one is available, otherwise an email if one is available).

Each contact 505 may include current presence status 405 of the contact 505. The presence status 405 presented in the unified contacts view 400 may be updated continuously, periodically, or upon user input. In one embodiment, a green icon indicates an online/available presence, a red icon indicates an offline presence, and an orange icon indicates an online/busy presence. Alternatively, presence status may be indicated in other ways (e.g., by color coding a name of the contact). Presence status 405 may also indicate additional presence information such as with customized messages and/or icons/images (e.g., away from keyboard, be right back, in meeting, etc.). Each contact 505 may also include information indicating how long the contact 505 has been online, offline, available, away, etc.

The softkey bar 345 presented in the unified contacts view 400 includes icons and/or text representing multiple predefined filtered views. Each predefined filtered view may present a predefined subset of the contacts 505 included in the unified contacts list. In one embodiment, a first icon 510 (e.g., three bracketed horizontal lines) represents an unfiltered view, a second icon (e.g., a cellular phone with an arrow) represents online contacts, and a third icon (e.g., a speech balloon or star) represents favorite contacts. Alternatively more of fewer icons and/or text may be used to represent the same or different filtered views. For example, a predefined subset of the contacts representing the most recent contacts contacted may be represented by an icon, and/or a predefined subset of contacts representing the most frequently contacted contacts may be represented by an icon.

A predefined subset of contacts 505 currently presented in the unified contacts view 500 may be indicated by highlighting text and/or icons within the softkey bar 345. In the illustrated embodiment, the first icon 510 representing an unfiltered view is highlighted. Different filtered views may be presented if a filter command is received (e.g., when a user pushes a filter key). In one embodiment, a filter function is assigned to a softkey, such that when the appropriate softkey is pressed, a next predefined subset of the contacts is shown in the unified contacts view 500. In this manner, the different predefined filtered views may be easily scrolled between by repetitively toggling the filter key. In other words, the screen may conveniently display different filtered views one after another by simple user interaction with the filter key and without obscuring the presented views in any manner (e.g., without displaying popup windows, vertical or horizontal panes, etc.).

Figure 5B:
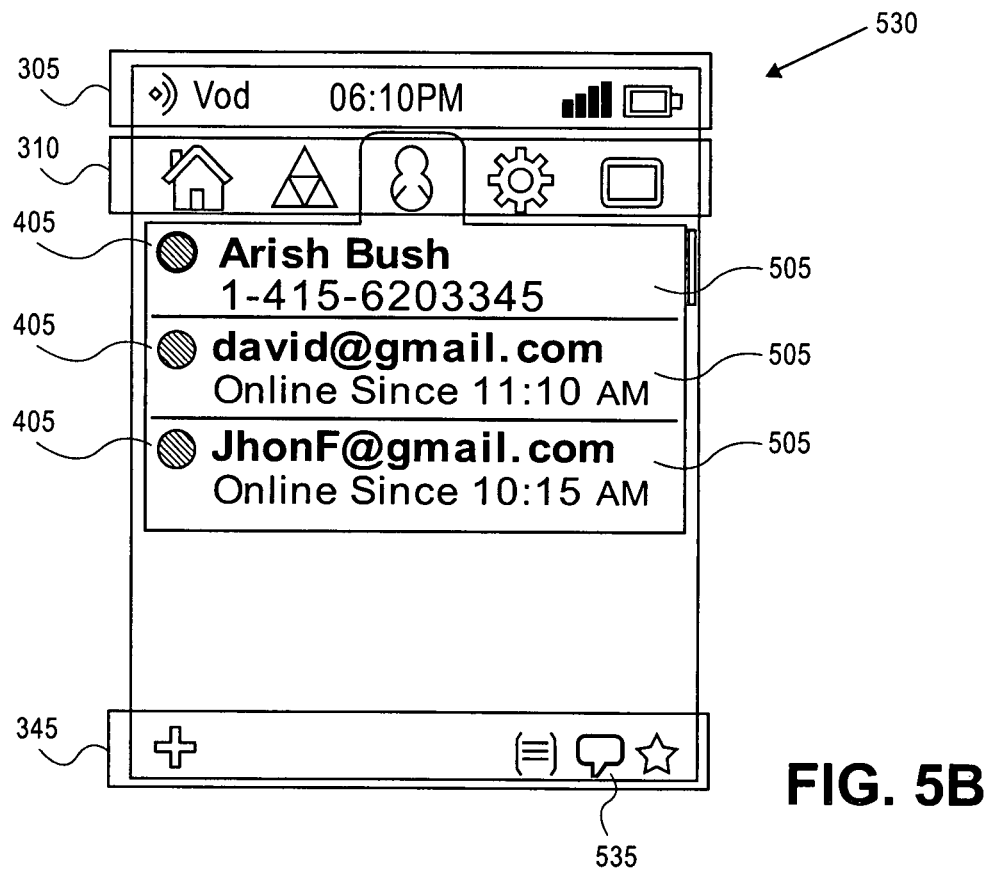
FIG. 5B illustrates a unified contacts view of a graphical user interface presented by a multimodal communication device, in accordance with another embodiment of the present invention.

FIG. 5B illustrates a unified contacts view 530 of a graphical user interface presented by a multimodal communication device, in accordance with another embodiment of the present invention. In one embodiment, unified contacts view 530 displays a first predefined subset of the contacts included in the unified contacts list. The predefined subset currently presented in the unified contacts view 530 is indicated by highlighting an icon (e.g., the second icon 535) within the softkey bar 345. In the illustrated embodiment, the second icon 535 represents a filtered view that displays only online contacts 505. The presence status 405 indicates that each of the contacts 505 are currently online.

Figure 5C:
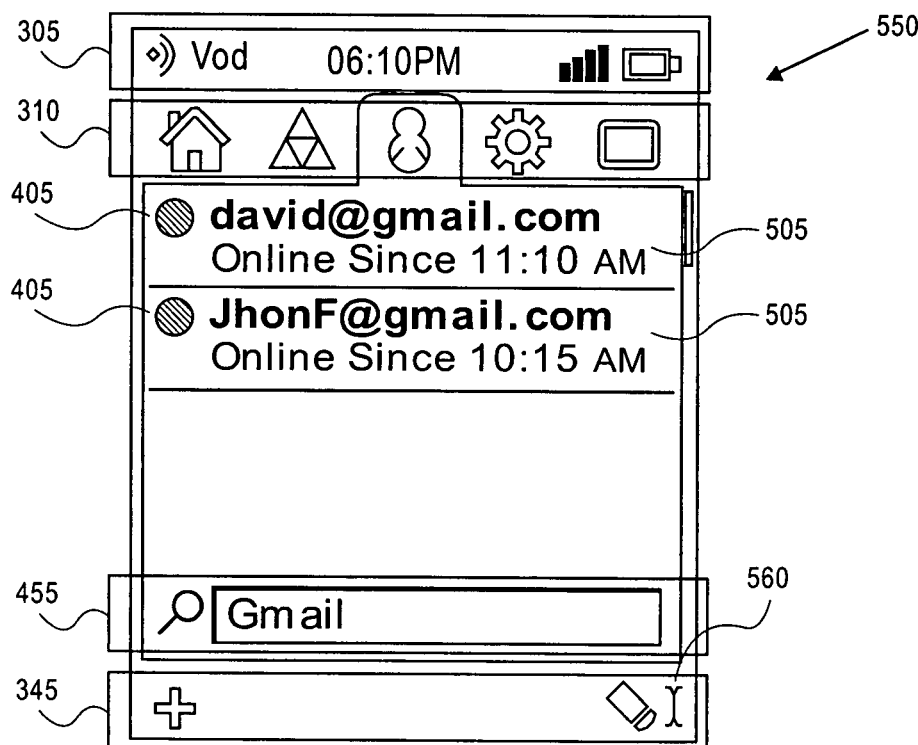
FIG. 5C illustrates a unified contacts view of a graphical user interface presented by a multimodal communication device, in accordance with yet another embodiment of the present invention.

FIG. 5C illustrates a unified contacts view 550 of a graphical user interface presented by a multimodal communication device, in accordance with yet another embodiment of the present invention. In one embodiment, unified contacts view 550 displays a subset of the contacts included in unified contacts view 530 of FIG. 5B after a keyword filter has been applied. Alternatively, unified contacts view 550 displays a subset of the contacts included in unified contacts view 500 of FIG. 5A after the keyword filter has been applied. The keyword filter may be applied upon receiving a user command to execute a keyword filter. The keyword filter command may be received when the user enters a keyword using an alphanumeric keypad (e.g., when the presses a number or letter key). If the keyword filter command is received while unified contacts view 530 of FIG. 5B is presented, the predefined filter may be removed before applying the keyword filter. Alternatively, the keyword filter may be applied in addition to the predefined filter.

Referring to FIG. 5C, a search bar 455 may be presented in the unified contacts view 550 when the keyword filter is initiated. In one embodiment, the search bar 455 is presented upon a user pressing a key in an alphanumeric keypad. In the illustrated embodiment, a keyword "gmail" has been entered. Therefore, two contacts are presented, each including the word gmail.

The softkey bar 345 presented in unified inbox view 550 may include icons 560 indicating one or more actions (e.g., editing actions such as erase, backspace, copy, etc.) when the keyword filter is applied.

Figure 6:
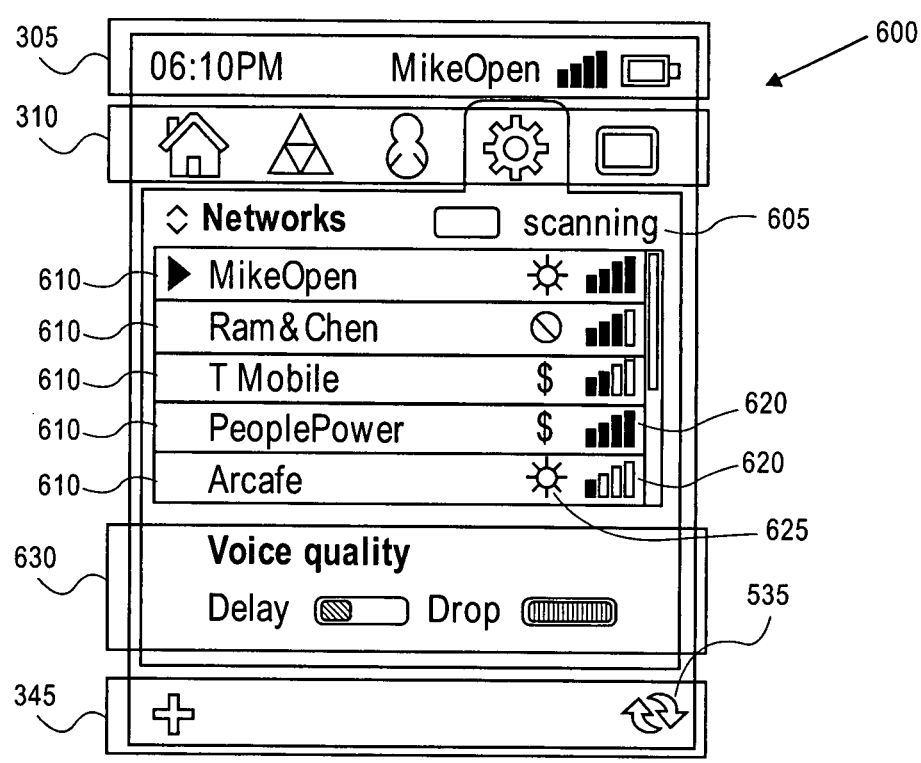
FIG. 6 illustrates a settings view of a graphical user interface presented by a multimodal communication device, in accordance with one embodiment of the present invention.

FIG. 6 illustrates a settings view 600 of a graphical user interface presented by a multimodal communication device, in accordance with one embodiment of the present invention. In one embodiment, the multimodal communication device corresponds to multimodal communication device 170 of FIG. 1B.

Referring to FIG. 6, settings view 600 can include title bar 305, navigation bar 310, and softkey bar 345. An icon of a gear in the navigation bar 310 representing the settings view 600 is highlighted to indicate that the settings view 600 is being presented. Settings view may display wireless fidelity (WiFi) settings, VOIP settings, services settings, etc. For purposes of illustration, the settings view 600 is shown to display WiFi settings.

The title bar 305 displayed in settings view 600 may include the name of a network currently connected to, or the first few (e.g., 5, 8, 10, 15, etc.) characters of the name. Settings view 600 may include a network status indicator 605 that displays information such as whether the multimodal communication device is idle, scanning, selecting, connecting, getting an IP address, connected, disconnected, etc. Settings view 600 may include detected networks 610. Each detected network 610 may include text and/or an icon representing a network access policy 625 of the network 610. Examples of network access policies include paid access (represented by a dollar sign), free access (represented by a gear), denied access (represented by a "no" symbol), etc. Each detected network 610 may also include a signal strength indicator 620.

Settings view 600 may include a voice quality indicator that indicates the voice quality of VOIP used over the selected network 610. A voice quality check may automatically be performed when a network 610 is selected. Voice quality indicator may determine voice quality by assessing latency (delay) and dropped packets (drop). Lower delay and lower drop indicates a better voice quality.

Figure 7A:
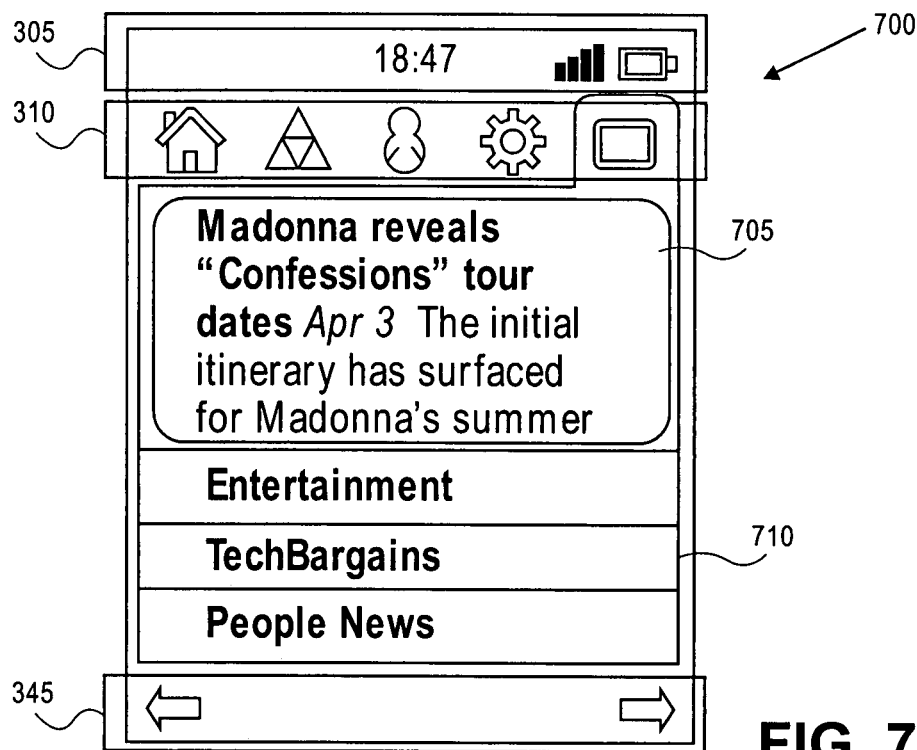
FIG. 7A illustrates a media view of a graphical user interface presented by a multimodal communication device, in accordance with one embodiment of the present invention.
Figure 7B:
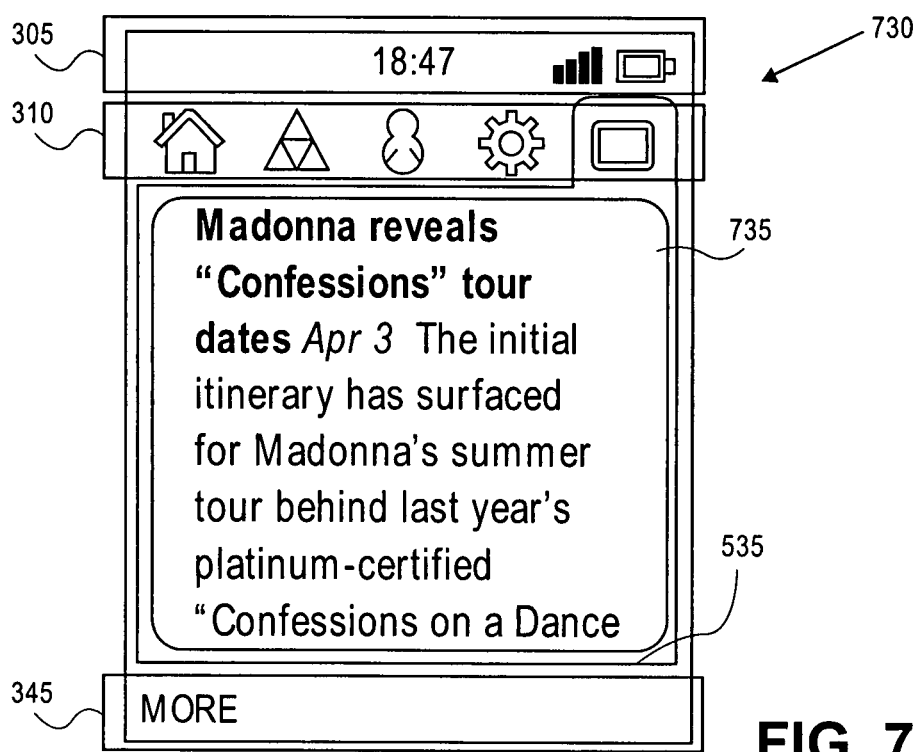
FIG. 7B illustrates a media view of a graphical user interface presented by a multimodal communication device, in accordance with another embodiment of the present invention.

FIG. 7A illustrates a media view 700 of a graphical user interface presented by a multimodal communication device, in accordance with one embodiment of the present invention. In one embodiment, the multimodal communication device corresponds to multimodal communication device 170 of FIG. 1B.

Referring to FIG. 7A, media view 700 can include title bar 305, navigation bar 310, and softkey bar 345. An icon of a television in the navigation bar 310 representing the media view 700 is highlighted to indicate that the media view 700 is being presented.

Figure 7C:
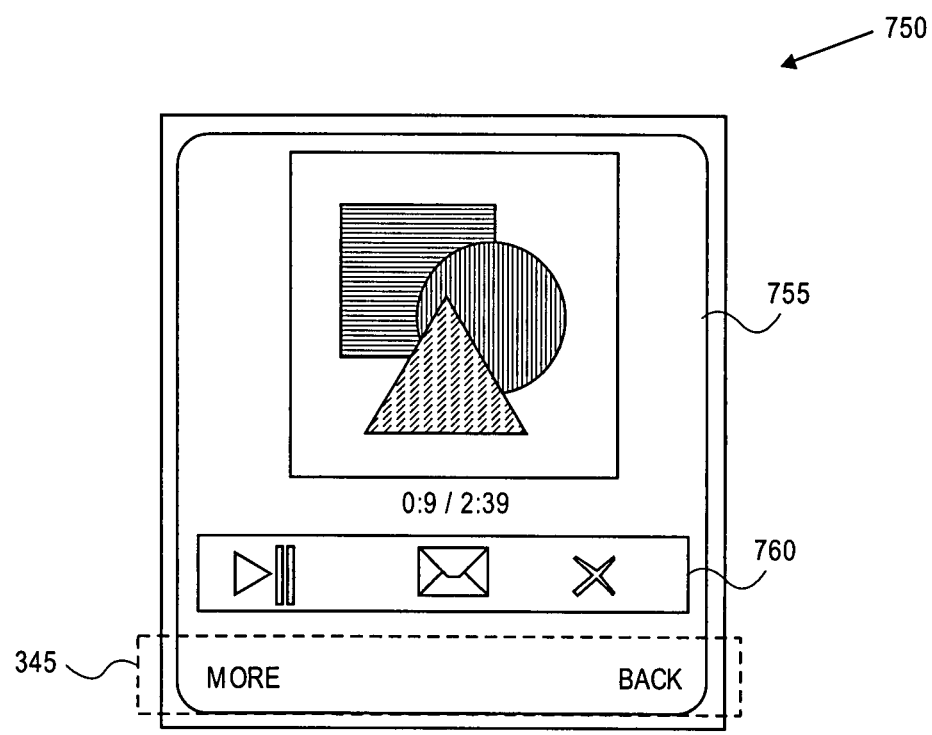
FIG. 7C illustrates a fullscreen media view, in accordance with one embodiment of the present invention.

Media view 700 presents an information display 705 that includes text, graphics, videos, etc. of currently viewed media. Media view 700 also includes a media selection list 710 that shows different media categories. Media categories may be selected to view specific media items, such as television programs, RSS feeds, websites, etc. Once a media item has been chosen, the media selection list 710 may be minimized to show an expanded information display, as shown in media view 730 of FIG. 7B. A fullscreen media view 755 may also be presented, as shown in FIG. 7C. The fullscreen media view 750 may include an action bar 760 and softkey bar 345, but may not include title bar or navigation bar. Action bar 760 may include a command for playing/pausing video content, sending a media item to a destination user, deleting a media item, etc.

Figure 8A:
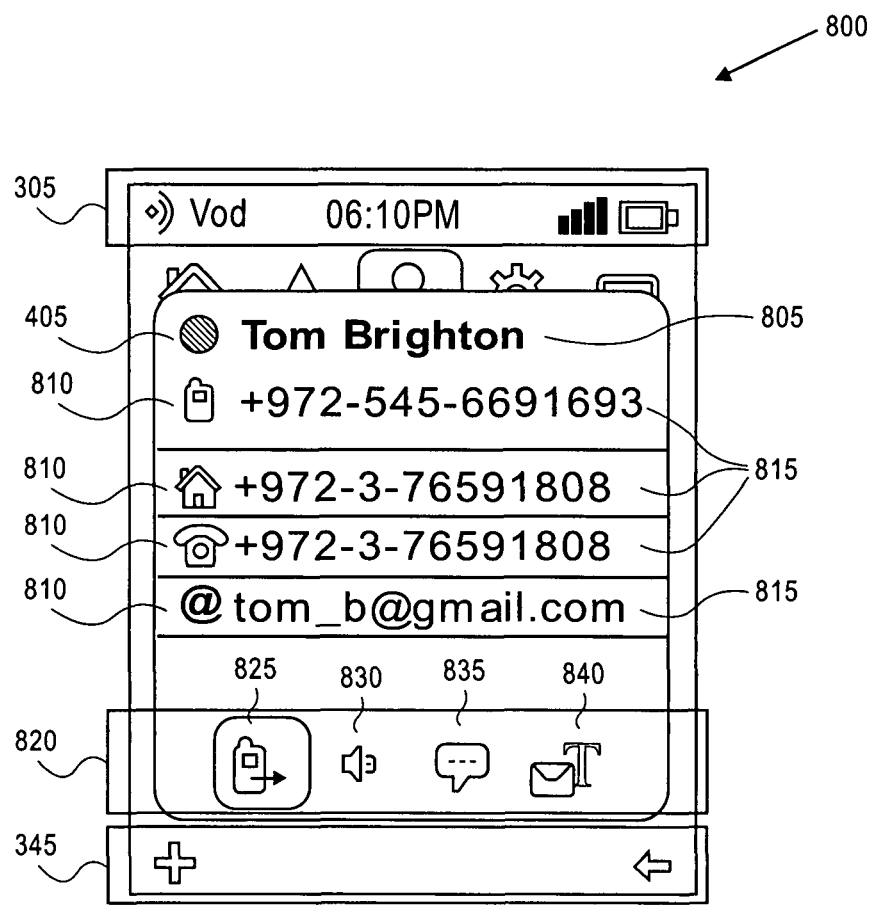
FIG. 8A illustrates a contact view of a graphical user interface presented by a multimodal communication device, in accordance with one embodiment of the present invention.

FIG. 8A illustrates a contact view 800 of a graphical user interface presented by a multimodal communication device, in accordance with one embodiment of the present invention. In one embodiment, the multimodal communication device corresponds to multimodal communication device 170 of FIG. 1B. Contact view 800 is a view of a specified contact. The contact may be specified (e.g., selected) from a unified contacts view (e.g., 500, 530, 550), from a unified inbox view (e.g., 400, 430, 450), or from another view.

Referring to FIG. 8A, contact view 800 can include title bar 305 and softkey bar 345. Contact view 800 may also include a navigation bar. Contact view includes a contact name 805, presence status 405 for the contact, and one or more contact information entries 815. Examples of contact information entries 815 include a home phone, a cellular phone, a work phone, an email address, an IM address, etc. Each contact information entry 815 may include a contact information icon 810 that indicates a type of the contact information entry 815 (e.g., home phone, email address, etc.). For example, the illustrated embodiment includes an icon of a home indicating a home phone number, an icon of a cellular phone indicating a cellular phone number, an icon of a dial phone indicating a work phone number and an icon of an "at" sign indicating an email address. Other symbols may also be used for the same or different types of contact information entries 815.

Contact view 800 may also include a communication action bar 820. Communication action bar 820 presents one or more communication mode categories, each communication mode category including one or more communication modes. In one embodiment, communication action bar 820 includes a synchronous voice communication mode category 825, represented by an icon of a phone and an arrow, an asynchronous voice communication mode category 830, represented by an icon of a speaker, a synchronous text communication mode category 835, represented by an icon of a speech balloon, and an asynchronous text communication mode category 840, represented by a an icon of an envelope and a T. The synchronous voice communication mode category 825 may include communication modes such as, for example, cellular phone service, VOIP, PTT, etc. The asynchronous voice communication mode category 830 may include communication modes such as, for example, voicemail, voice email, V-note, etc. The synchronous text communication mode category 835 may include communication modes such as, for example, instant messaging. The asynchronous text communication mode category 840 may include communication modes such as, for example, email, SMS, etc. Alternatively, the communication action bar 820 may include other communication mode categories, represented by text and/or icons.

Communication mode categories may be shown in an enabled or disabled state. A communication mode category may be shown in a disabled state if there are no available communication modes within the communication mode category. A communication mode category may be shown in an enabled state if there is at least one available communication mode within the communication mode category.

In one embodiment, communication mode categories may be selected upon a user pressing right and/or left directional keys. Thereby, selected communication mode categories may be scrolled between. Alternatively, other selection means may be used. For example, each communication mode category may be linked to a specific key or group of keys (e.g., CRTL+1, ALT+2, etc.), a pointer controlled by a touchpad or mouse may be used, etc. In one embodiment, disabled communication mode categories may not be selected.

Contact view 800 may display a highlighted (selected) communication mode category in the action bar 820 when the contact view 800 is presented (e.g., when a contact is selected from the unified inbox view or the unified contacts view). In one embodiment, the highlighted communication mode category corresponds to a communication mode category that includes an optimal global communication mode for communicating with the contact. The optimal global communication mode may be automatically selected for the highlighted communication mode category. Therefore, if a user presses a talk key when the contact view 800 is presented, communication may be initiated with the contact using the optimal global communication mode. In the illustrated embodiment, the synchronous voice communication mode category 825 is highlighted.

In a further embodiment, an optimal local communication mode is automatically determined and/or selected for each communication mode category. Thereby, when a communication mode category is selected, the user may initiate communication with the contact using the optimal local communication mode of the selected communication mode category by satisfying a predefined condition. The predefined condition may include pressing the send/talk key, pressing another key, providing voice activation, providing no input for a time interval, etc. In the following description, when the term "pressing the send key" or similar terms are used, it is understood that such terms are used to improve readability, and include other means of satisfying a predefined condition as well. The optimal global communication mode and optimal local communication modes may be determined as detailed above with reference to FIG. 1B.

Referring to FIG. 8A, in one embodiment the communication mode categories included in communication action bar 820 are displayed in a ranked order. The rank may be determined automatically by determining an optimization value for each communication mode category. Thereby, for example, the communication mode categories may be ranked from a most optimal communication mode category to a least optimal communication mode category. Alternatively, the communication mode categories may be displayed in a predetermined order regardless of which communication mode category is optimal.

Figure 8B:
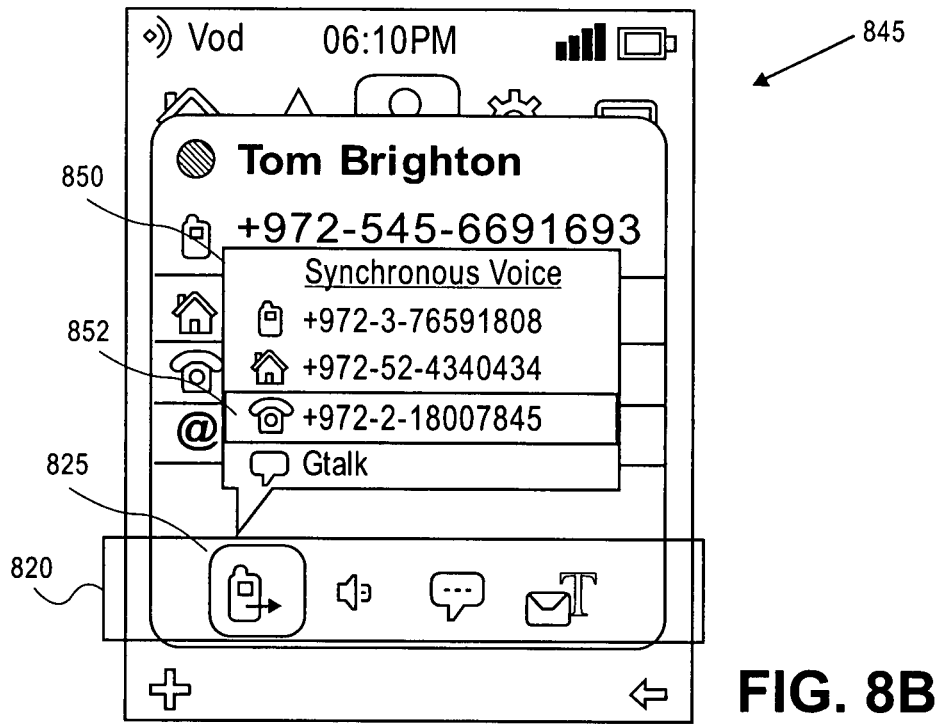
FIG. 8B illustrates a contact view of a graphical user interface presented by a multimodal communication device, in accordance with another embodiment of the present invention.

FIG. 8B illustrates a contact view 845 of a graphical user interface presented by a multimodal communication device, in accordance with another embodiment of the present invention. In contact view 845, a window 850 is presented that displays communication modes included in a selected communication mode category. In the illustrated example, window 850 displays communication modes included in the synchronous voice communication mode category 825. In one embodiment, window 850 is a popup window that overlays contact information entries. Alternatively, window 850 may be a pane presented to the right, left, above or below the contact information entries. Window 850 may appear momentarily (e.g., for a few seconds), or may remain open until it is closed. In one embodiment, window 850 will close automatically if no user input is detected for a predetermined time period (e.g., 2 seconds, 4 seconds, etc.).

In one embodiment, window 850 displays all communication modes included in the selected communication mode category. Alternatively, window may display communication modes included in the communication mode category that are currently available. For example, if a presence status of the contact indicates that the contact is offline, then instant messaging communication modes may not be displayed.

Communication modes displayed in window 850 may be selected 852, such as by using up/down directional keys, using a joystick, pressing a key associated with a communication mode, etc. Once a communication mode has been selected, communication may be initiated with the contact using the communication mode if the send key is pressed. In one embodiment, an optimal local communication mode is automatically selected. The automatic selection may be replaced by a user selection.

Figure 8C:
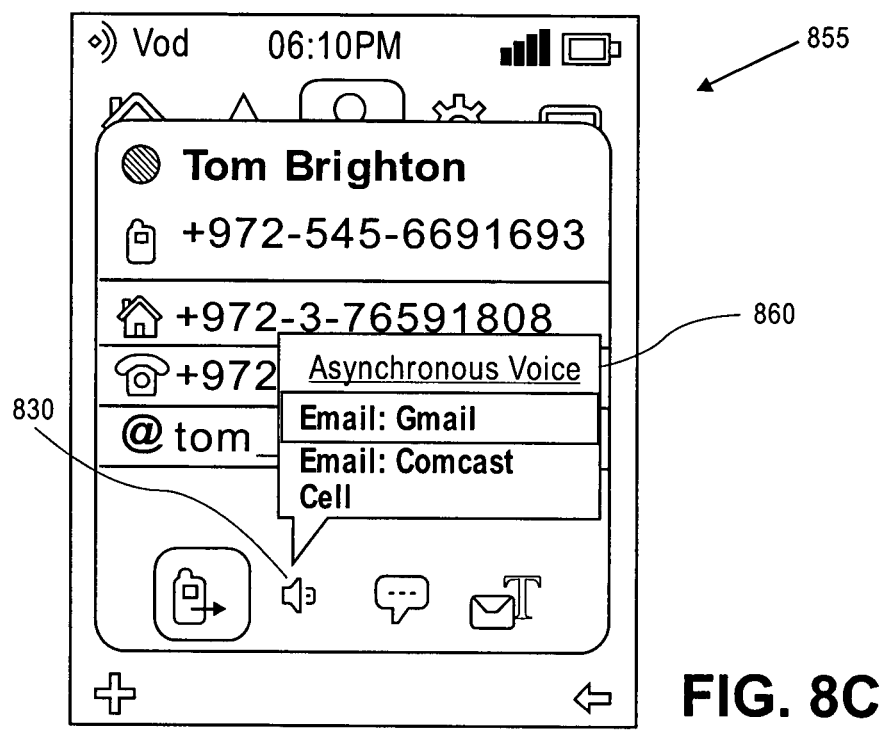
FIG. 8C illustrates an additional contact view, in accordance with a further embodiment of the present invention.
Figure 8D:
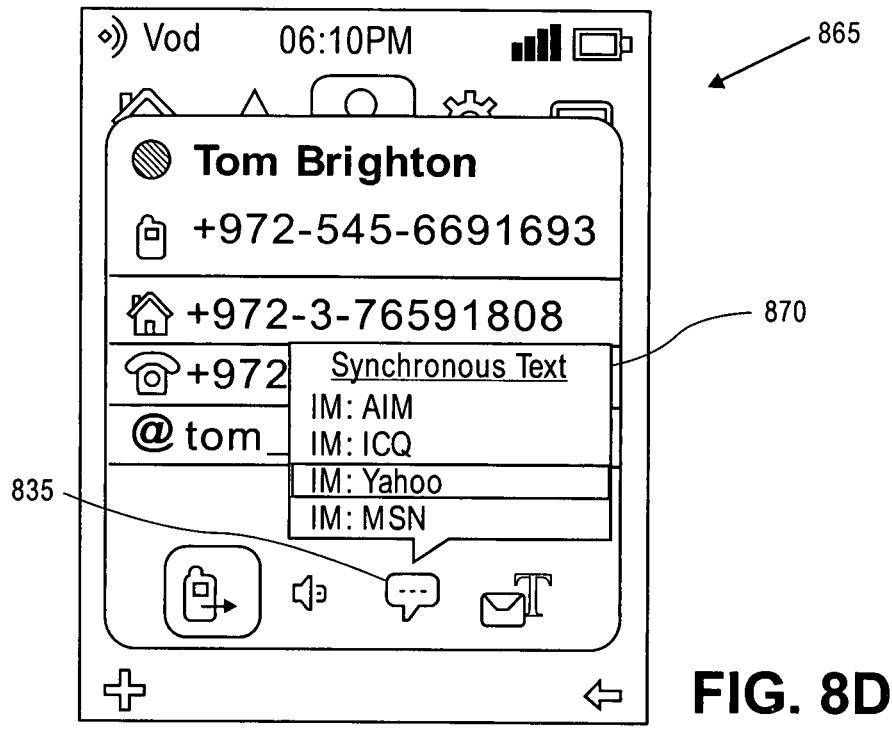
FIG. 8D illustrates an additional contact view, in accordance with a further embodiment of the present invention.
Figure 8E:
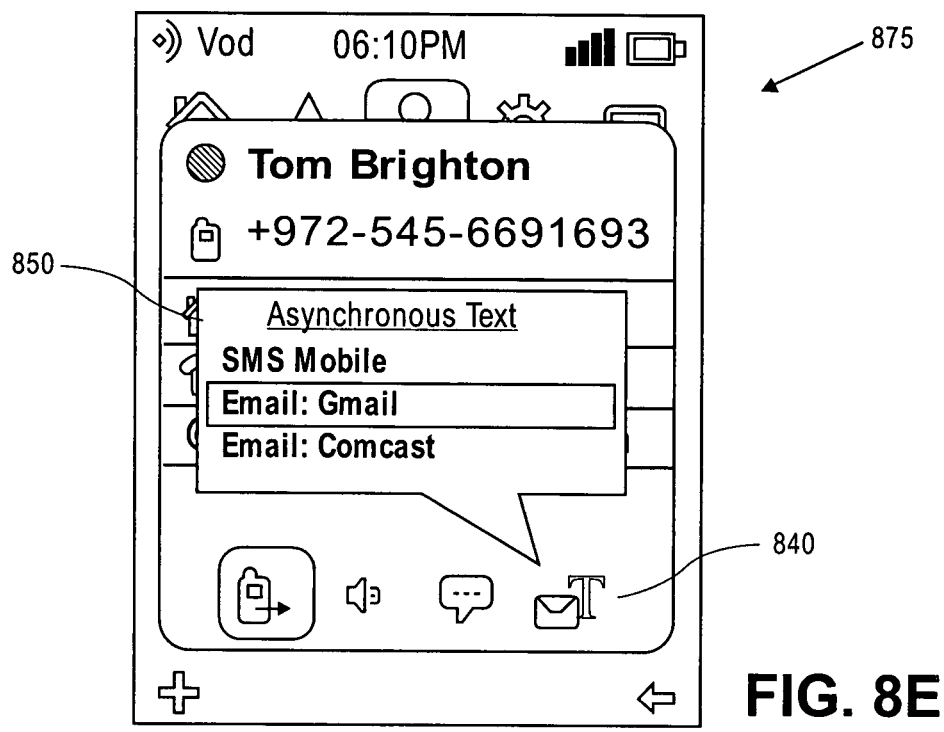
FIG. 8E illustrates an additional contact view, in accordance with a further embodiment of the present invention.

FIGS. 8C-8E illustrate additional contact views 855, 865 and 875, respectively, in accordance with further embodiments of the present invention. Contact view 855 of FIG. 8C displays an asynchronous voice window 860 that presents available communication modes included in asynchronous voice communication mode category 830. Contact view 865 of FIG. 8D displays a synchronous text window 870 that presents available communication modes included in synchronous text communication mode category 835. Contact view 875 of FIG. 8E displays an asynchronous text window 880 that presents available communication modes included in asynchronous text communication mode category 840.

Figure 8F:
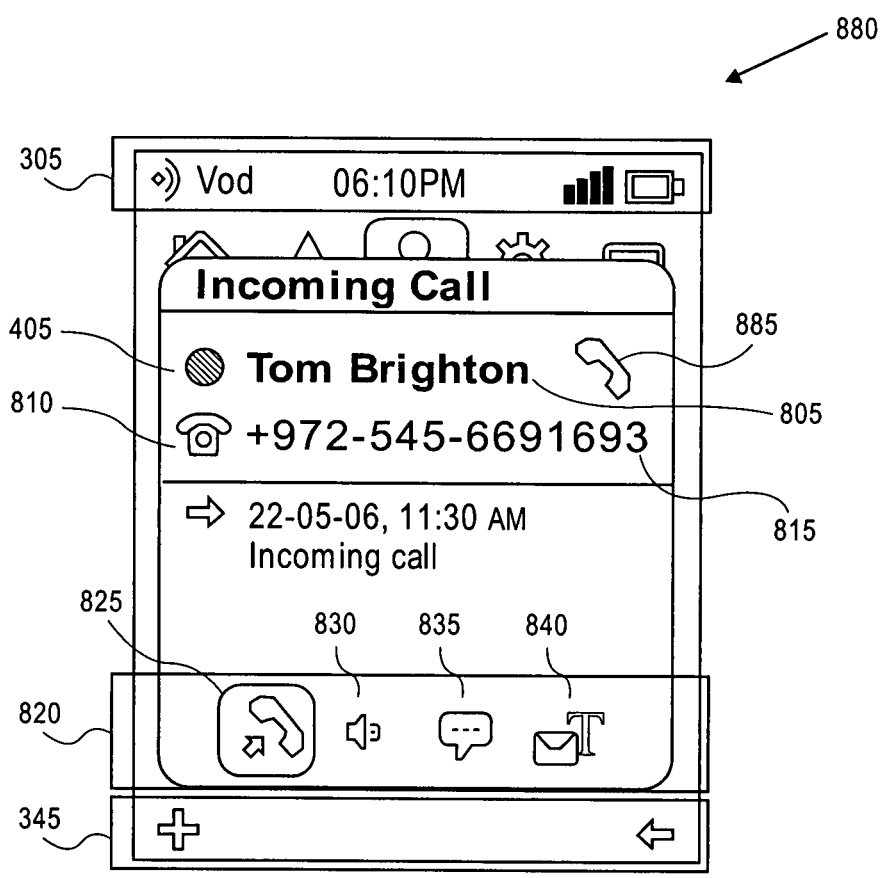
FIG. 8F illustrates an incoming communication view of a graphical user interface presented by a multimodal communication device, in accordance with another embodiment of the present invention.

FIG. 8F illustrates an incoming communication view 880 of a graphical user interface presented by a multimodal communication device, in accordance with another embodiment of the present invention. In one embodiment, the multimodal communication device corresponds to multimodal communication device 170 of FIG. 1B.

Referring to FIG. 8F, incoming communication view 880 can include one or more of title bar 305, navigation bar, and softkey bar 345. Incoming communication view 880 can include a contact name 805 of a sender of the incoming communication, presence status 405 of the sender, and a contact information entry 815 of the incoming communication (e.g., a phone number of the phone that is placing a call to the multimodal communication device). The contact information entry 815 may include a contact information icon 810 that indicates a type of the contact information entry 815 (e.g., home phone, email address, etc.). For example, the illustrated embodiment includes an icon of a dial phone, which may indicate a work phone number. The incoming communication view 880 may also include a communication type 885 represented by an icon and/or text that indicates whether the incoming communication is a phone call, an SMS message, a IM, etc.

Incoming communication view 880 can include communication action bar 820. When presented in incoming communication view 880, communication action bar 820 displays multiple response options to respond to the incoming communication. In one embodiment, the response options are divided into communication mode categories, each of which may include one or more communication modes for initiating a response. In a further embodiment, the communication mode categories include a synchronous voice communication mode category 825, an asynchronous voice communication mode category 830, a synchronous text communication mode category 835, and an asynchronous text communication mode category 840.

Optimal global and local communication modes to receive and/or reply to the incoming communication may be determined as discussed above with reference to FIG. 1B. For example, if the incoming communication is a phone/voice call, then a cheapest phone service may automatically be determined. If the cheapest phone service is, for example, the cellular phone number that was dialed by the sender of the phone call, then the phone call may be answered if a send/answer key is pressed. Alternatively, if the cheapest phone service is a VOIP phone service, then pressing a send/answer key may refuse the incoming phone call and immediately call back the sender using the VOIP phone service. In another example, if the multimodal communication device has been set to a "do not disturb" profile, then a default action to a voice call may be to respond by IM.

In one embodiment, incoming communication view 880 is displayed when the multimodal communication device receives an incoming voice/phone call. Alternatively, incoming communication view 880 may be displayed when the multimodal communication device receives a new email message, SMS message, IM message, voice message, etc. In one embodiment, the incoming communication view 880 is displayed for a predefined time period (e.g., 1 second, 2 seconds, 5 second, etc.). If a predetermined key (e.g., a send key or select key) is pressed while the incoming communication view 880 is being displayed, a read/hear message view may be displayed if the incoming communication is a message, or a current call view may be displayed if the incoming communication is a call.

In one embodiment, the optimal global communication mode is automatically initiated as part of an optimal action if no user input is received within a predetermined time period. The optimal action may be, for example, to transmit an auto-response to an email, SMS, IM account, etc. of the sender using the optimal global communication mode. Other example auto-responses include automatically directing a phone call to a custom voicemail intro, and auto-forwarding the incoming communication to the optimal global communication mode (e.g., redirect an IM message to email, an email message to IM, an IM voice call to a PSTN voice call, etc.)

In another embodiment, if no input is received within the predetermined time period (e.g., if no keys are pressed, or specified keys are not pressed), a view that was displayed prior to displaying the incoming communication view may again be displayed. For example, if a unified contacts view was being displayed when an incoming SMS message was received, then the unified contacts view may again be displayed if the send key is not pressed within the predefined time period. Alternatively, a default view (e.g., home view)

may automatically be displayed when the incoming communication view 880 is no longer displayed.

Figure 9:
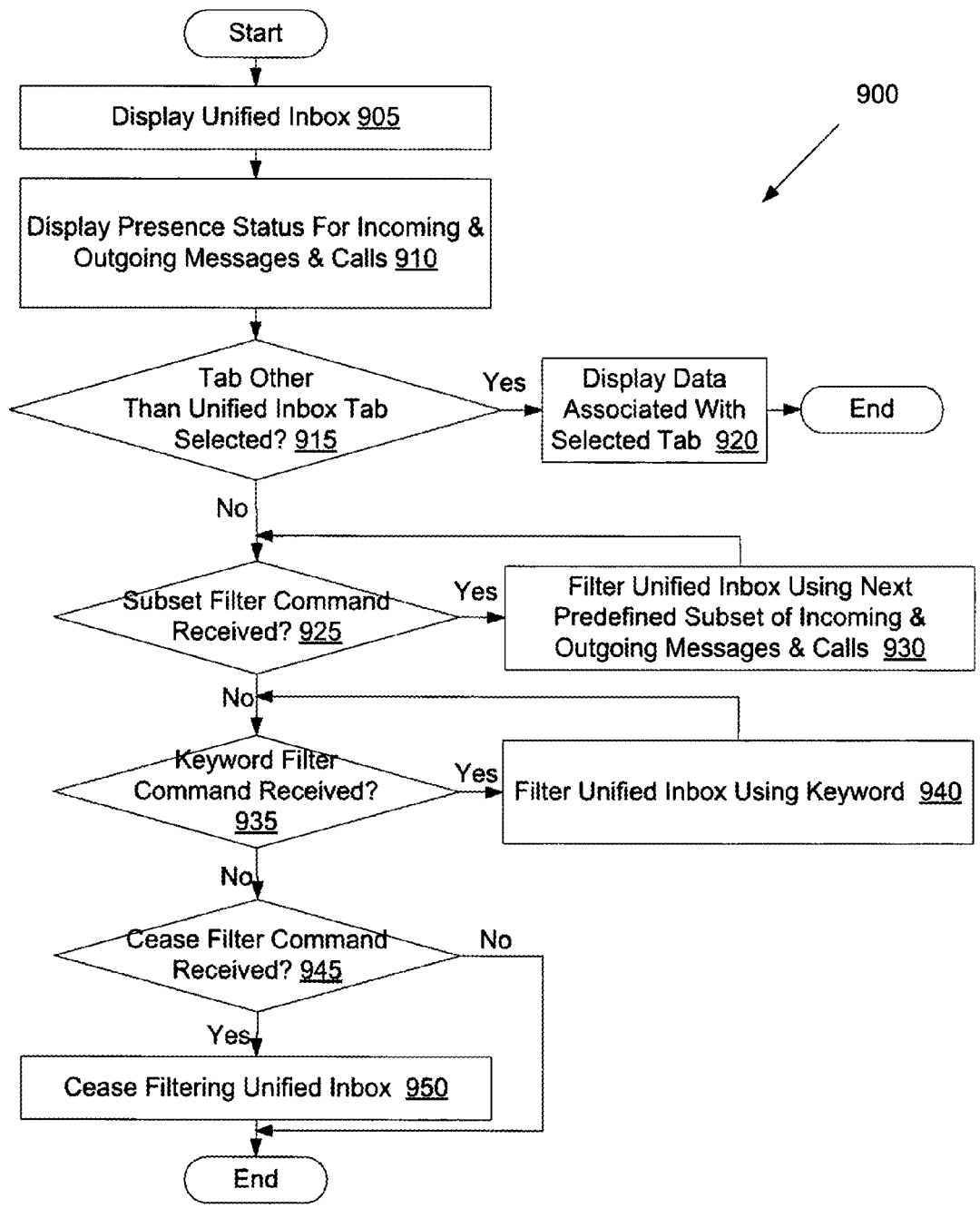
FIG. 9 illustrates a flow diagram of one embodiment for a method of displaying calls and messages in a user interface of a multimodal communication device.

FIG. 9 illustrates a flow diagram of one embodiment for a method 900 of displaying calls and messages in a user interface of a multimodal communication device. The method may be performed by processing logic that may comprise hardware (e.g., circuitry, dedicated logic, programmable logic, microcode, etc.), software (such as instructions run on a processing device), or a combination thereof. In one embodiment, method 900 is performed by multimodal communication device 170 of FIG. 1B.

Referring to FIG. 9, method 900 begins with processing logic displaying a unified inbox (block 905). The unified inbox may be displayed in a first view, and may include multiple incoming and outgoing messages and calls. In one embodiment the unified inbox includes all stored incoming and outgoing messages and calls. At block 910, presence status is displayed in the unified inbox for one or more incoming and/or outgoing message and/or call. The presence status may be displayed in the first view along with the appropriate message or call.

At block 915, processing logic determines whether a tab other than a tab representing the unified inbox has been selected. Examples of such tabs include a unified contacts tab, a settings tab, a home tab, and a media tab. If such a tab has been selected, then the method proceeds to block 920, and data associated with the selected tab is displayed (e.g., if the settings tab is selected, then a settings view may be displayed). If no such tab has been selected, then the method proceeds to block 925.

At block 925, processing logic determines whether a subset filter command has been received. The subset filter command may be received when a filter key is pressed. In one embodiment, the filter key is a softkey that has been assigned a predefined filter function. If a subset filter command has been received, the method proceeds to block 930. If no subset filter command has been received, the method continues to block 935.

At block 930, the unified inbox is filtered using a next predefined subset of the incoming and outgoing messages and calls. For example, if the next predefined subset is a calls subset, then only incoming and outgoing calls may be displayed. The method then returns to block 925.

At block 935, processing logic determines whether a keyword filter command has been received. The keyword filter command may be received when a keyword has been detected (e.g., when a key of an alphanumeric keyboard is pressed). If the keyword filter command is received, the method proceeds to block 940. If no keyword filter command is received, the method continues to block 945. At block 940, the unified inbox is filtered using the received keyword. The method then returns to block 935.

At block 945, processing logic determines whether a cease filter command has been received. A cease filter command may be received, for example, when an end key is pressed. If no cease filter command is received, the method ends. If a cease filter command is received, the method proceeds to block 950, and one or more filters are removed from the unified inbox. In one embodiment, the cease filter command causes the unified inbox to become unfiltered. In another embodiment, if a keyword filter is being applied, the cease filter command removes the keyword filter.

Figure 10:
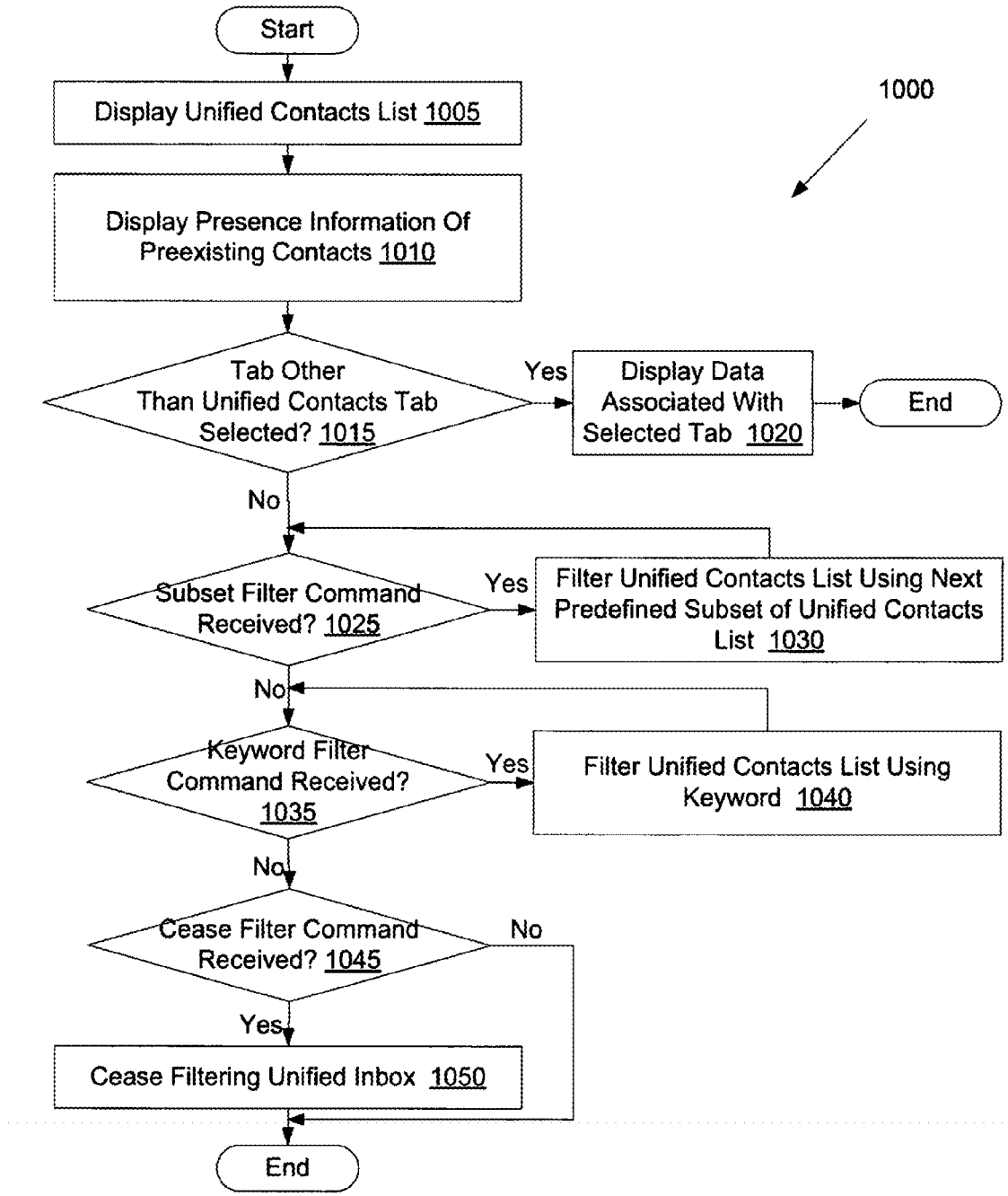
FIG. 10 illustrates a flow diagram of one embodiment for a method of displaying contacts in a user interface of a multimodal communication device.

FIG. 10 illustrates a flow diagram of one embodiment for a method 1000 of displaying contacts in a user interface of a multimodal communication device. The method may be performed by processing logic that may comprise hardware (e.g., circuitry, dedicated logic, programmable logic, microcode, etc.), software (such as instructions run on a processing device), or a combination thereof. In one embodiment, method 1000 is performed by multimodal communication device 170 of FIG. 1B.

Referring to FIG. 10, method 1000 begins with processing logic displaying a unified contacts list (block 1005). The unified contacts list may be displayed in a second view, and may include multiple contacts. In one embodiment the unified contacts list includes all stored contacts, regardless of contact type (e.g., phone contact, email contact, work contact, etc.). At block 1010, presence status is displayed in the unified contacts list for one or more contact. The presence status may be displayed in the second view along with the appropriate contact.

At block 1015, processing logic determines whether a tab other than a tab representing the unified contacts list has been selected. If such a tab has been selected, then the method proceeds to block 1020, and data associated with the selected tab is displayed (e.g., if the settings tab is selected, then a settings view may be displayed). If no such tab has been selected, then the method proceeds to block 1025.

At block 1025, processing logic determines whether a subset filter command has been received. If a subset filter command has been received, the method proceeds to block 1030. If no subset filter command has been received, the method continues to block 1035.

At block 1030, the unified inbox is filtered using a next predefined subset of the unified contacts list. For example, if the next predefined subset is online contacts, then only contacts with an online/available or online/busy presence status may be displayed. The method then returns to block 1025.

At block 1035, processing logic determines whether a keyword filter command has been received. If the keyword filter command is received, the method proceeds to block 1040. If no keyword filter command is received, the method continues to block 1045. At block 1040, the unified inbox is filtered using the received keyword. The method then returns to block 1035.

At block 1045, processing logic determines whether a cease filter command has been received. If no cease filter command is received, the method ends. If a cease filter command is received, the method proceeds to block 1050, and one or more filters are removed from the unified contacts list. In one embodiment, the cease filter command causes the unified contacts list to become unfiltered. In another embodiment, if a keyword filter is being applied, the cease filter command removes the keyword filter.

Figure 11:
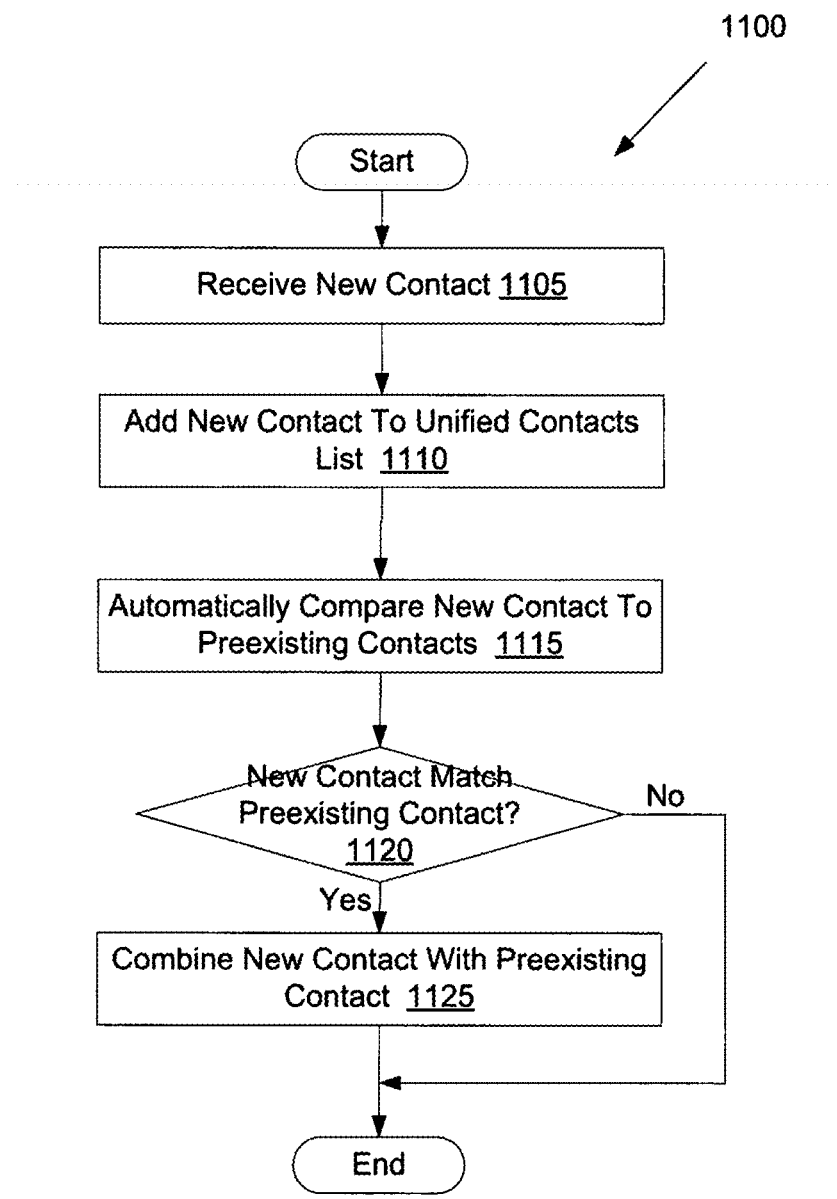
FIG. 11 illustrates a flow diagram of one embodiment for a method of consolidating a list of contacts.

FIG. 11 illustrates a flow diagram of one embodiment for a method 1100 of consolidating a list of contacts. The method may be performed by processing logic that may comprise hardware (e.g., circuitry, dedicated logic, programmable logic, microcode, etc.), software (such as instructions run on a processing device), or a combination thereof. In one embodiment, method 1100 is performed by multimodal communication device 170 of FIG. 1B.

Referring to FIG. 11, method 1100 begins with processing logic receiving a new contact (block 1105). At block 1110, the new contact is added to the unified contacts list. At block 1115, the new contact is automatically compared to preexisting contacts. At block 1120, processing logic determines whether the new contact matches any of the preexisting contacts. If no match is found, the method ends. If a match is found, the method proceeds to block 1125. At block 1125, the new contact is combined with the preexisting contact. The method then ends.

Figure 12:
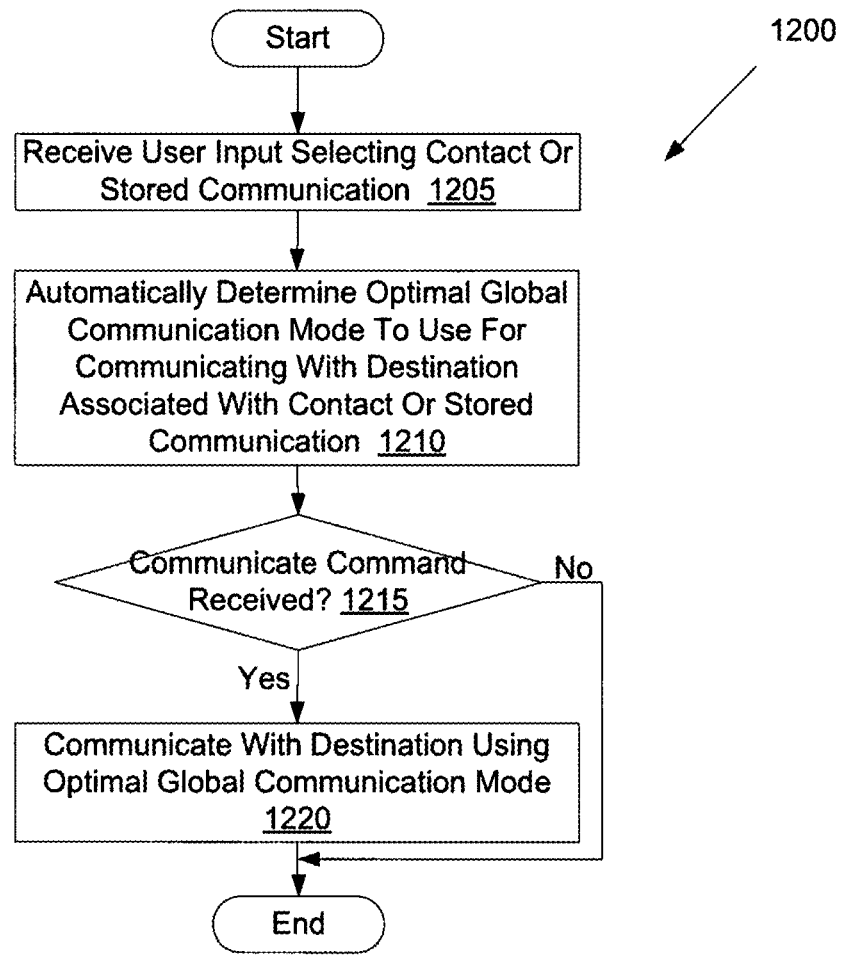
FIG. 12 illustrates a flow diagram of one embodiment for a method of communicating with a destination.

FIG. 12 illustrates a flow diagram of one embodiment for a method 1200 of communicating with a destination user. The method may be performed by processing logic that may comprise hardware (e.g., circuitry, dedicated logic, programmable logic, microcode, etc.), software (such as instructions run on a processing device), or a combination thereof. In one embodiment, method 1200 is performed by multimodal communication device 170 of FIG. 1B.

Referring to FIG. 12, method 1200 begins with processing logic receiving user input selecting a contact or a stored communication (e.g., an incoming or outgoing call or message) (block 1205). At block 1210, processing logic automatically determines an optimal global communication mode to use for communicating with a destination user associated with the contact or stored communication. Examples of communication modes include cellular service, VOIP, email, IM, etc.

At block 1215, processing logic determines whether a communicate command has been received. A communicate command may be received, for example, when a send/call key is pressed. If no communicate command is received, the method ends. If a communicate command is received, the method proceeds to block 1220. At block 1220, processing logic communicates with the destination user using the optimal global communication mode. The method then ends.

Figure 13:
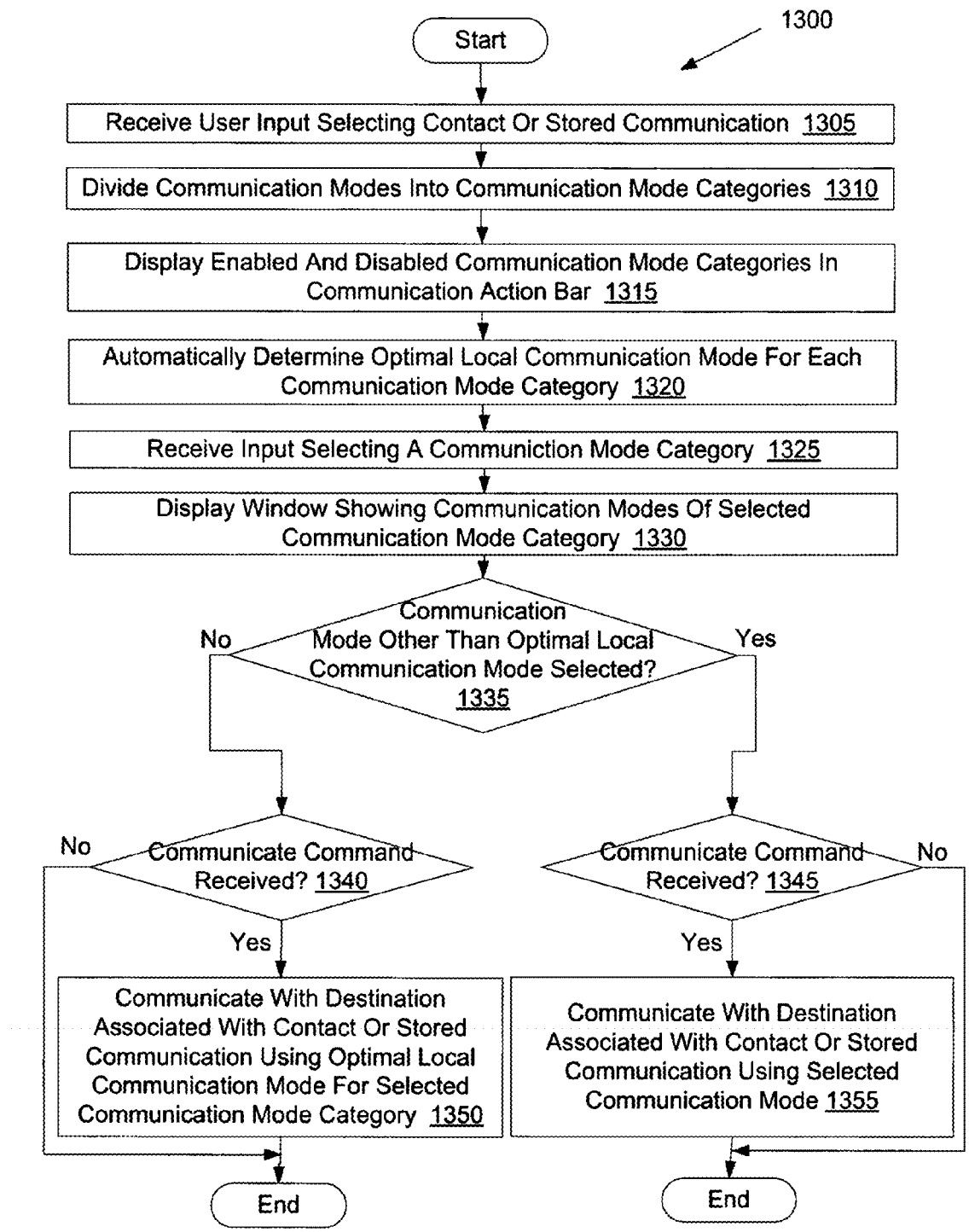
FIG. 13 illustrates a flow diagram of another embodiment for a method of communicating with a destination.

FIG. 13 illustrates a flow diagram of another embodiment for a method 1300 of communicating with a destination user. The method may be performed by processing logic that may comprise hardware (e.g., circuitry, dedicated logic, programmable logic, microcode, etc.), software (such as instructions run on a processing device), or a combination thereof. In one embodiment, method 1300 is performed by multimodal communication device 170 of FIG. 1B.

Referring to FIG. 13, method 1300 begins with processing logic receiving user input selecting a contact or a stored communication (e.g., an incoming or outgoing call or message) (block 1305). At block 1310, communication modes are divided into multiple communication mode categories. Examples of communication mode categories include synchronous voice communications, synchronous text communications, etc.

At block 1315, enabled and disabled communication mode categories are displayed in a communication action bar. An enabled communication mode category may be displayed if there is at least one available communication mode within the communication mode category. If there are no available communication modes within the communication mode category, then a disabled state may be displayed.

At block 1320, processing logic automatically determines optimal local communication modes for each communication mode category. At block 1325, input is received selecting a communication mode category. At block 1330, a window is displayed showing communication modes of the selected communication mode category. In one embodiment, available communication modes are shown. The window may be a popup window, a vertical or horizontal pane, etc.

At block 1335, processing logic determines whether a communication mode other than the optimal local communication mode has been selected. If such a non-optimal communication mode has been selected, the method proceeds to block 1345. If no such non-optimal communication mode has been selected, the method proceeds to block 1340.

At block 1340, processing logic determines whether a communicate command has been received. A communicate command may be received, for example, when a send/call key is pressed. If no communicate command is received, the method ends. If a communicate command is received, the method proceeds to block 1350. At block 1350, processing logic communicates with the destination user associated with the selected contact or stored communication using the optimal local communication mode for the selected communication mode category. The method then ends.

At block 1345, processing logic determines whether a communicate command has been received. If no communicate command is received, the method ends. If a communicate command is received, the method proceeds to block 1355. At block 1355, processing logic communicates with the destination user associated with the selected contact or stored communication using the selected communication mode. The method then ends.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a multi-modal communication device, a user input selecting one of a contact and a stored communication, wherein each of the contact and the stored communication is associated with a destination;
    determining, by the multi-modal communication device, an optimal global communication mode from a plurality of communication modes to use for communicating with the destination;
    determining to communicate with the destination using the optimal global communication mode if a predefined condition is satisfied, wherein the predefined condition includes a determination that no communication mode other than the optimal global communication mode has been selected;
    determining to divide the plurality of communication modes into a plurality of communication mode categories, wherein each communication mode category includes at least one of the plurality of communication modes;
    determining to display each of the plurality of communication mode categories in a communication action bar;
    for each of the plurality of communication mode categories, determining to display the communication mode category in an enabled state if one or more of the at least one of the plurality of communication modes included in the communication mode category are available; and
    for each of the plurality of communication mode categories, determining to display the communication mode category in a disabled state if none of the at least one of the plurality of communication modes included in the communication mode category are available,
    wherein the optimal global communication mode is determined using one or more of attributes related to the multi-modal communication device, a previous communication mode used between the multi-modal communication device and the destination, user preferences, contact type, attributes of the destination, and availability of service for the communication modes.

2. The method of claim 1, wherein each of the plurality of communication mode categories is represented by a distinct icon in the communication action bar.

3. The method of claim 1, wherein the plurality of communication mode categories include a synchronous voice communication mode category, an asynchronous voice communication mode category, a synchronous text communication mode category, and an asynchronous text communication mode category.

4. The method of claim 3, wherein:
the synchronous voice communication mode category includes a cellular phone call mode, a voice over internet protocol phone call mode, a video call mode and a push to talk mode;
the asynchronous voice communication mode category includes a voice-mail mode, a voice email mode, a video email mode, an MMS mode and a v-note mode;
the synchronous text communication mode category includes an instant messaging mode; and
the asynchronous text communication mode category includes an email mode, and an SMS mode.

5. The method of claim 1, further comprising:
automatically determining an optimal local communication mode for each of the plurality of communication mode categories.

6. The method of claim 5, further comprising:
if one of the plurality of communication mode categories is selected, determining to communicate with the destination using the optimal local communication mode for the selected communication mode category if the send key is pushed.

7. The method of claim 1, further comprising:
if one of the plurality of communication mode categories is selected, determining to display a window from which the user may choose an available one of the communication modes included in the selected communication mode category.

8. A non-transitory computer readable medium carrying one or more instructions which, when executed by one or more processors, cause an apparatus to at least perform the following steps:
receiving, by a multi-modal communication device, a user input selecting one of a contact and a stored communication, wherein each of the contact and the stored communication is associated with a destination;
determining an optimal global communication mode from a plurality of communication modes to use for communicating with the destination;
determining to communicate with the destination using the optimal global communication mode if a predefined condition is satisfied, wherein the predefined condition includes a determination that no communication mode other than the optimal global communication mode has been selected;
determining to divide the plurality of communication modes into a plurality of communication mode categories, wherein each communication mode category includes at least one of the plurality of communication modes;
determining to display each of the plurality of communication mode categories in a communication action bar;
for each of the plurality of communication mode categories, determining to display the communication mode category in an enabled state if one or more of the at least one of the plurality of communication modes included in the communication mode category are available; and
for each of the plurality of communication mode categories, determining to display the communication mode category in a disabled state if none of the at least one of the plurality of communication modes included in the communication mode category are available,
wherein the optimal global communication mode is determined using one or more of attributes related to the multi-modal communication device, a previous communication mode used between the multi-modal communication device and the destination, user preferences, contact type, attributes of the destination, and availability of service for the communication modes.

9. The non-transitory computer readable storage medium of claim 8, the method further comprising
wherein each of the plurality of communication mode categories is represented by a distinct icon in the communication action bar.

10. The non-transitory computer readable storage medium of claim 9, the method further comprising:
automatically determining an optimal local communication mode for each of the plurality of communication mode categories.

11. The non-transitory computer readable storage medium of claim 10, the method further comprising:
if one of the plurality of communication mode categories is selected, determining to communicate with the destination using the optimal local communication mode for the selected communication mode category if the send key is pushed.

12. The non-transitory computer readable storage medium of claim 9, the method further comprising:
if one of the plurality of communication mode categories is selected, determining to display a window from which the user may choose an available one of the communication modes included in the selected communication mode category.

13. An apparatus, comprising:
at least one processor; and
at least one memory including computer program code,
the at least one memory and the computer program code configured to, with the at least one processor, cause the apparatus to:
receive user input selecting a destination, the input including a send key;
determine a global optimal communication mode from a plurality of communication modes to use for communicating with the destination;
determine to communicate with the destination using the optimal communication mode if a predefined condition is satisfied, wherein the predefined condition includes a determination that no communication mode other than the optimal global communication mode has been selected;
determining to divide the plurality of communication modes into a plurality of communication mode categories, wherein each communication mode category includes at least one of the plurality of communication modes;
determining to display each of the plurality of communication mode categories in a communication action bar;
for each of the plurality of communication mode categories, determining to display the communication mode category in an enabled state if one or more of the at least one of the plurality of communication modes included in the communication mode category are available; and
for each of the plurality of communication mode categories, determining to display the communication mode category in a disabled state if none of the at least one of the plurality of communication modes included in the communication mode category are available,
wherein the optimal global communication mode is determined using one or more of attributes related to the multi-modal communication device, a previous communication mode used between the multi-modal communication device and the destination, user preferences, contact type, attributes of the destination, and availability of service for the communication modes.

14. The apparatus of claim 13, wherein the apparatus is further caused to automatically determine, for each of the plurality of communication mode categories, an optimal local communication mode from the at least one of the plurality of communication modes included in the communication mode category for communicating with the destination.

15. The apparatus of claim 14, wherein each of the plurality of communication mode categories is selectable by a user to communicate with the destination using the optimal communication mode for a selected communication mode category if a send key is pushed.

16. The apparatus of claim 13, wherein the apparatus is further caused to:
    determine to display a window when one of the plurality of communication mode categories is selected, the window displaying the at least one of the plurality of communication modes included in the selected communication mode category, wherein the at least one of the plurality of communication modes displayed in the window are user selectable.

\* \* \* \* \*